(12) United States Patent
Iwasaki et al.

(10) Patent No.: US 7,149,670 B2
(45) Date of Patent: Dec. 12, 2006

(54) METHOD FOR TIRE ROLLING SIMULATION

(75) Inventors: Naoaki Iwasaki, Kobe (JP); Masaki Shiraishi, Kobe (JP); Akio Miyori, Kobe (JP)

(73) Assignee: Sumitomo Rubber Industries, Ltd., Kobe (JP)

( * ) Notice: Subject to any disclaimer, the term of this patent is extended or adjusted under 35 U.S.C. 154(b) by 775 days.

(21) Appl. No.: 10/245,513

(22) Filed: Sep. 18, 2002

(65) Prior Publication Data

US 2003/0055617 A1   Mar. 20, 2003

(30) Foreign Application Priority Data

| Sep. 18, 2001 | (JP) | ............................ P2001-283686 |
| Oct. 25, 2001 | (JP) | ............................ P2001-328101 |
| Dec. 26, 2001 | (JP) | ............................ P2001-394748 |

(51) Int. Cl.
    *G06G 7/48*   (2006.01)
(52) U.S. Cl. ......................................................... 703/8
(58) Field of Classification Search .................... 703/8
     See application file for complete search history.

(56) References Cited

U.S. PATENT DOCUMENTS

| 6,430,993 | B1 * | 8/2002 | Seta ............................ 73/146 |
| 6,564,625 | B1 * | 5/2003 | Ishiyama ...................... 73/146 |
| 6,763,288 | B1 * | 7/2004 | Caretta et al. ................. 701/1 |

FOREIGN PATENT DOCUMENTS

| EP | 1 030 170 | 8/2000 |
| JP | 2000-141509 | 5/2000 |

OTHER PUBLICATIONS

Mundl et al., Tire Science & Technology, TSTCA, vol. 25, No. 4, pp. 245-264 (1997).
Schmid et al., Seoul 2000 FISITA World Automotive Congress, (Jun. 12-15, 2000) Seoul, Korea.
Okano et al., Tire Science and Technology, TSTCA, vol. 29, No. 1, pp. 2-22 (2001).
Meschke et al., Computer Methods and Advances in Geomechanics, pp. 623-628 (1992).
Finite Element Analysis on Three-Dimensional Elastoplasticity of Ground (no translation).

* cited by examiner

*Primary Examiner*—Paul Rodriguez
*Assistant Examiner*—Andre Pierre-Louis
(74) *Attorney, Agent, or Firm*—Birch, Stewart, Kolasch & Birch, LLP

(57) ABSTRACT

The present invention is a method for tire rolling simulation comprising the steps of: setting a tire model by modeling a tire with the use of elements capable of numerical analysis; setting a road surface model including a road-surface matter model formed by modeling road-surface matter forming a road surface with the use of elements that can be numerically analyzed and can cause a volume change due to compression which is substantially permanent; and performing a tire rolling simulation by making the tire model get in contact with the road-surface matter model, thereby providing the tire model with rotating conditions, and conducting deformation calculations of the tire model and the road-surface matter model at minute time increment intervals.

9 Claims, 26 Drawing Sheets

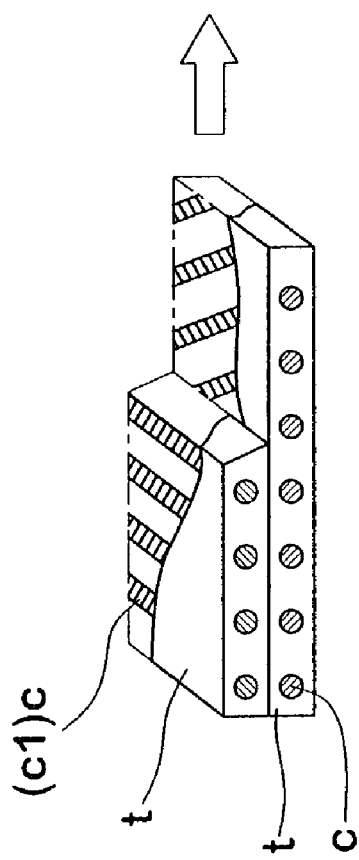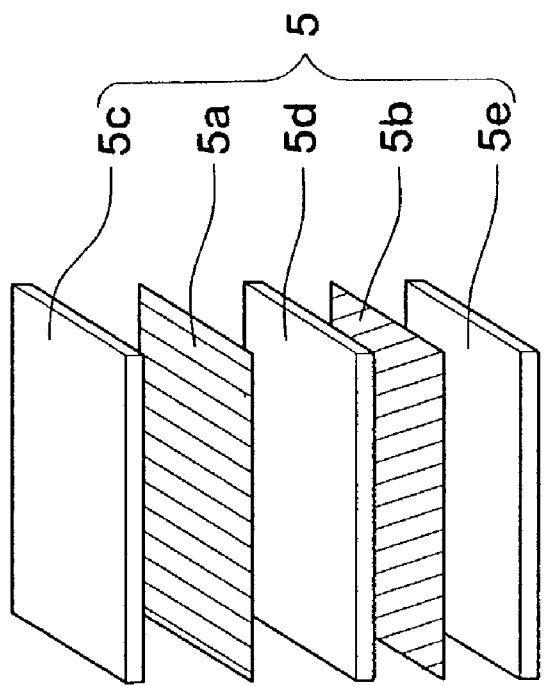
Fig.5

METHOD FOR TIRE ROLLING SIMULATION

This Non-provisional application claims priority under 35 U.S.C. § 119(a) on Patent Application No(s). P2001-283686, filed in Japan on Sep. 18, 2001, P2001-328101, filed in Japan on Oct. 25, 2001, and P2001-394748, filed in Japan on Dec. 26, 2001; the entire contents of these applications are hereby incorporated by reference.

BACKGROUND OF THE INVENTION

1. Field of the Invention

The present invention relates to a method for tire rolling simulation capable of predicting by numerical analysis method the performance of tires rolling on road-surface matter such as snow, mud, or soil which are to be hardened by compression.

2. Background Art

Conventionally, tires have been developed by the procedure of prototype manufacturing, experiment actually, and improved product manufacturing based on the results of the experiments. This approach, however, is inefficient because the prototype manufacturing and experiments demand a lot of cost and time. To solve this drawback, computer simulation with numerical analysis method, such as finite element method, have been suggested. This approach enables the prediction of tire performance without prototyping tires.

However, the conventional simulation only involve rolling tires on dry or wet asphalt roads, and not on snowy roads. In numerical analysis, water is treated as an uncompressible fluid which does not change its volume with increasing pressure. Snow, on the other hand, should be treated as a compressible material which causes a volume change by compression and continues the volume changing. Therefore, the conventional approaches fail to perform accurately the tire rolling simulation on the snowy roads.

SUMMARY OF THE INVENTION

The present invention has an object to provide a method for a tire rolling simulation which can simulate tire diving on road-surface matter having compressibility. The present invention has another object to provide a method for a tire rolling simulation which analyses the interaction between the tire and the road-surface matter and helps the development of new tires. The present invention has further another object to provide a method for a tire rolling simulation which can simulate the tire rolling on the road-surface matter having compressibility efficiently within a comparatively short calculation time.

The present invention is a method for tire rolling simulation comprising the steps of: setting a tire model by modeling a tire with the use of elements capable of numerical analysis; setting a road surface model including a road-surface matter model formed by modeling road-surface matter forming a road surface with the use of elements that can be numerically analyzed and can cause a volume change due to compression which is substantially permanent; and performing a tire rolling simulation by making the tire model get in contact with the road-surface matter model, thereby providing the tire model with rotating conditions, and conducting deformation calculations of the tire model and the road-surface matter model at minute time increment intervals. The road-surface matter model is not restricted, but is preferably a snow material model formed by modeling snow.

It is preferable that the step of performing a tire rolling simulation comprises: a process of determining whether deformation of the elements is in a plastic region or elastic region based on the yield function set by using the first invariant of the stress tensor and the second invariant of the stress tensor which act on the elements of the road-surface matter model; and when it has been determined that the deformation of the elements is in the plastic region, a process of reducing the stress of the elements based on the yield function.

It is also preferable that there is a process of changing the time increment based on at least one value of the size, density, and hardness of each of the elements of a deformed tire model in the deformation calculation of the tire model. It is also preferable that there is a process of changing the time increment based on at least one value of the size, density, and hardness of each of the elements of a deformed snow material model in the deformation calculation of the snow material model.

The boundary condition of the deformation calculation of the snow material model preferably includes at least one of the shape and speed of the tire model, and the boundary condition of the deformation calculation of the tire model preferably includes at least one of the shape, speed, and reaction force of the snow material model.

The road surface model can include a first road-surface part on which the tire model drives first, and a second road-surface part on which the tire model drives the next, wherein the first road-surface part can be composed of an element with a stiff-surface not having the snow material model on a rolling surface thereof, and the second road-surface part can have a rolling surface which is the snow material model.

The step of performing a tire rolling simulation preferably comprises: a process of calculating the stress of the road-surface matter model based on a volumetric strain and a predetermined bulk modulus; a process of determining whether the deformation of the road-surface matter model is a plastic deformation or an elastic deformation; a process of determining whether the deformation of the road-surface matter model is under load conditions or no-load conditions; and a process for, when it has been determined that the road-surface matter model is plastically deformed and under load conditions, modifying the calculated stress of the road-surface matter model, based on a characteristic curve which shows the relation between the stress at the time of the predetermined plastic deformation and the volumetric strain.

BRIEF DESCRIPTION OF THE DRAWINGS

FIG. 5 is a perspective view explaining the modeling of cord reinforcements.

DESCRIPTION OF THE PREFERRED EMBODIMENTS

An embodiment of the present invention will be described as follows based on the drawings.

Figure 1:
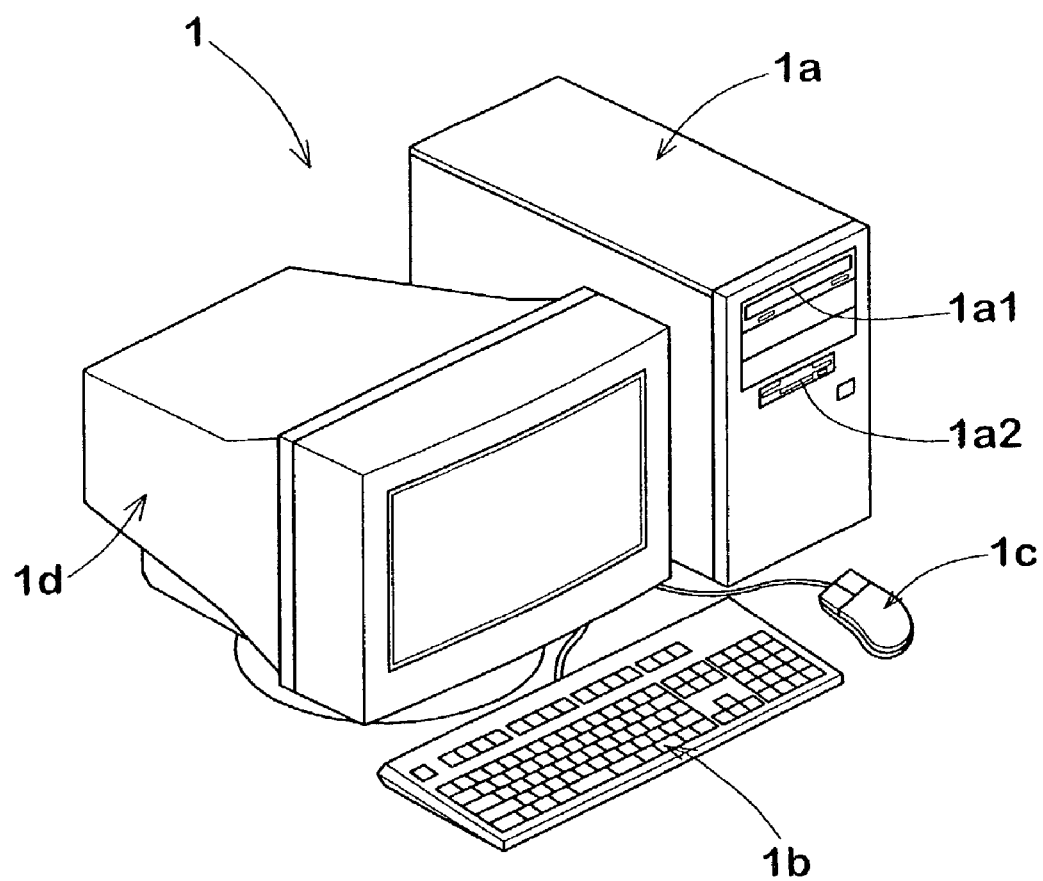
FIG. 1 is an illustration of the computer device for executing the simulation method.

This embodiment takes as an example a tire rolling simulation on a road whose surface is covered with snow. FIG. 1 shows the computer device 1 used for the simulation method of the present invention. The computer device 1 includes the main body 1*a*, the key board 1*b*, the mouse 1*c*, and the display device 1*d*. The main body la includes the disk drives 1*a*1, 1*a*2, a CPU, a ROM, memory, and bulk storage (which are not illustrated). The bulk storage stores programs which execute the simulation method described below.

Figure 2:
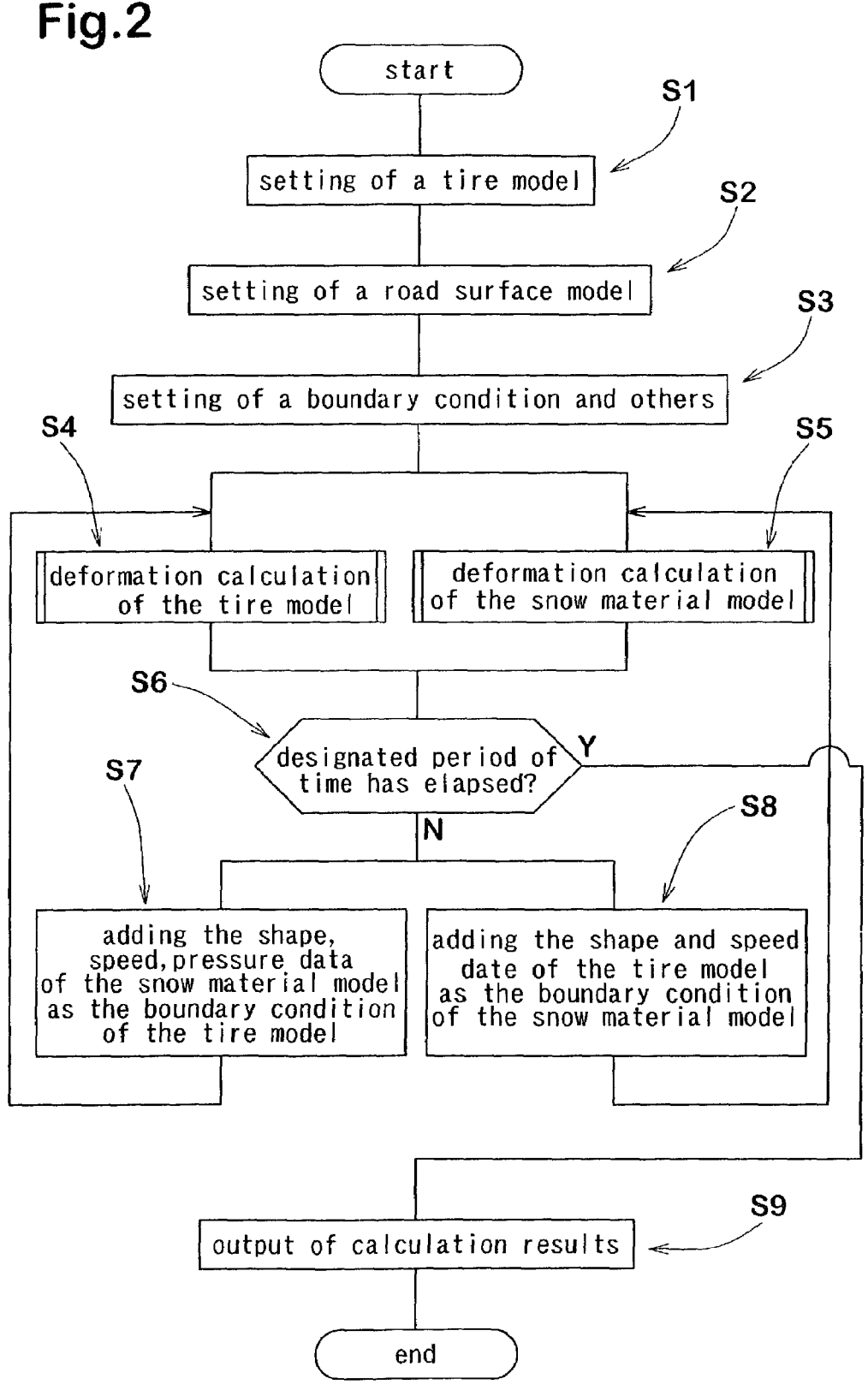
FIG. 2 is a flowchart showing an example of the procedure of the simulation.

FIG. 2 shows an example of the procedure of the simulation method.

In Step S1, a tire model is set which has been obtained by modeling a tire with elements capable of numerical analysis. The numerical analysis includes, for example, finite element method, finite volume method, difference method and boundary element method. In this example, finite element method is adopted.

Figure 3:
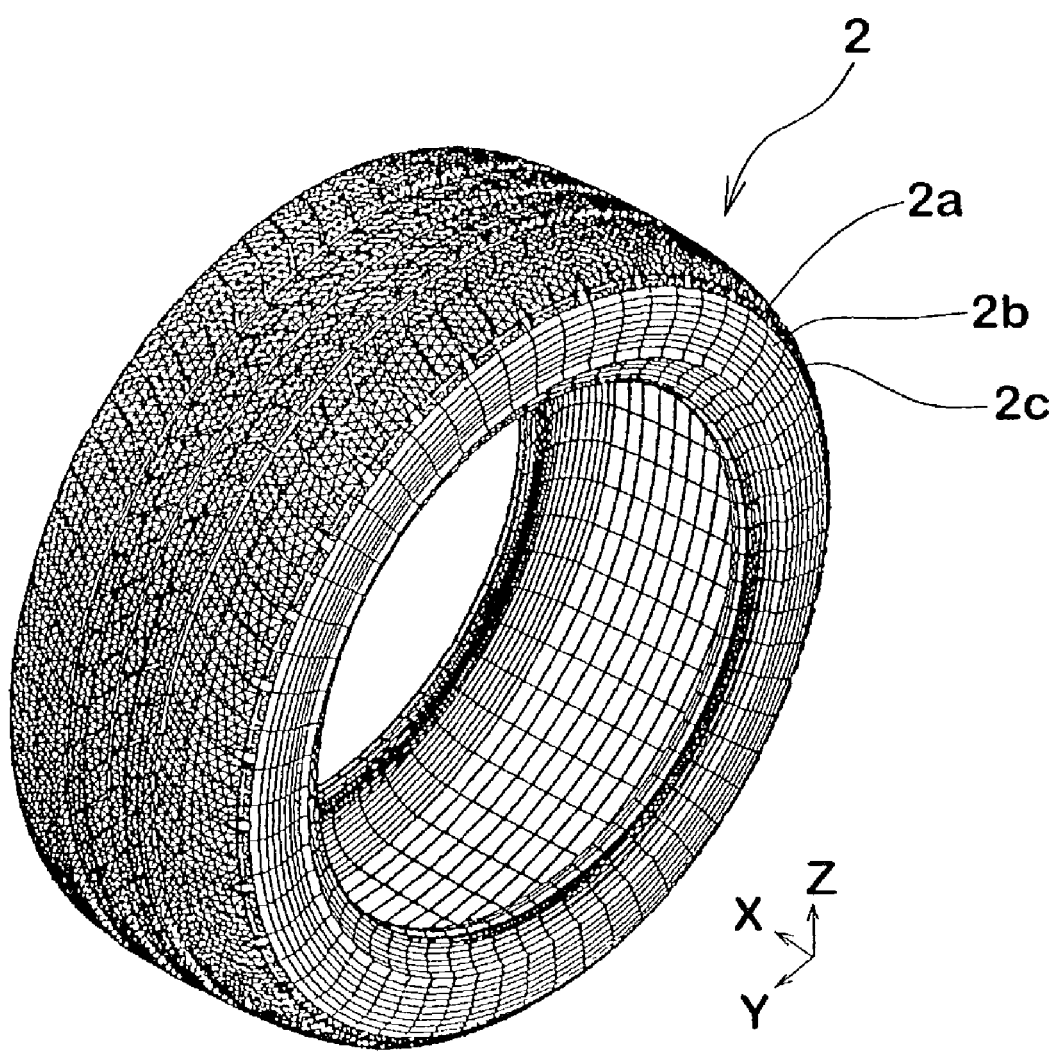
FIG. 3 is a perspective view of a tire model.

FIG. 3 is an example of the tire model 2 which is visualized three-dimensionally. In the tire model 2, the tire to be analyzed is divided into a finite number of small elements 2*a*, 2*b*, 2*c* . . . . These are numerical data capable of being treated in the computer device 1. The tire model 2, to be more specific, includes the coordinate values of the nodal points of the elements 2*a*, 2*b*, 2*c* . . . , their shapes, and material properties (density, Young's modulus, attenuation coefficient, and the like). Each of the elements 2*a*, 2*b*, 2*c* . . . can be a rectangular element which is a plane element or a tetrahedral solid element which is a three-dimensional element. Besides, other various elements could be adopted.

The tire model 2 shown in FIG. 3 includes tread grooves (vertical and horizontal grooves) formed on the tread surface, but these can be omitted. The circumferential length of one element arranged on the tread surface of the tire model 2 does not preferably exceed 25% of the tread contact length. This is useful for correct expression of the pressure of the contact portion of the tread surface or the distribution of the shearing force. The length of one element in the axial direction of the tire is preferably 20 mm or less.

Figure 4:
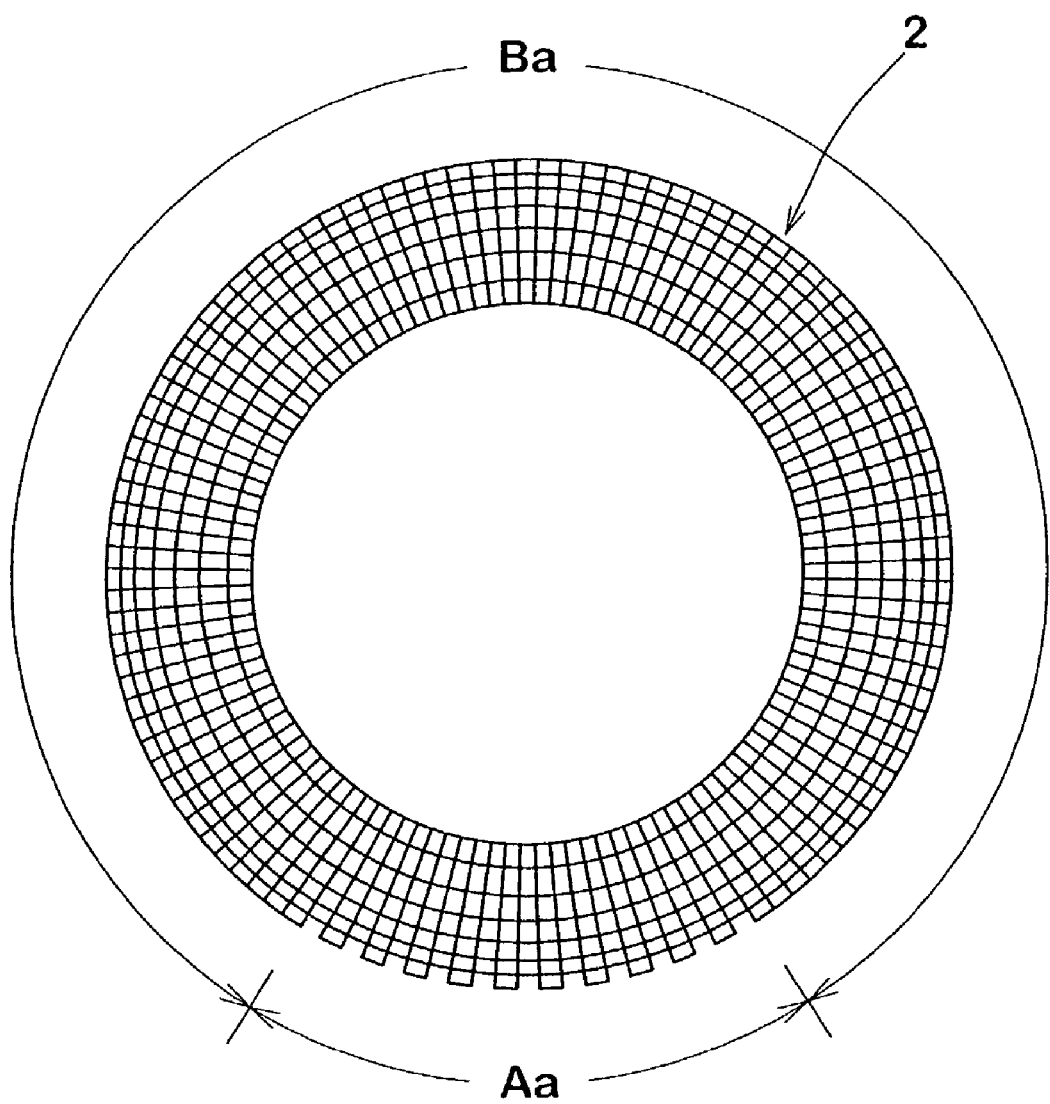
FIG. 4 is a side view of the tire model in another embodiment.

As shown in FIG. 4, the tire model 2 could be a combination of the detailed pattern part Aa which has modeled grooves on the tread surface and the simple pattern part Ba which has no grooves on the tread surface. The detailed pattern part Aa is longer than the tread contact, but is shorter than the simple pattern part Ba. This helps to accelerate the calculation time by reducing the number of elements in the tire model 2 as a whole.

FIG. 5 shows an example of the modeling of a code arrangement member c (a belt ply, a carcass ply, or the like). The code arrangement member c is modeled into the rectangular membrane elements 5*a*, 5*b*, and the topping rubber t is modeled into the solid elements 5*c*, 5*d*, 5*e*. These elements are stacked in the direction of thickness. The membrane elements 5*a*, 5*b* have anisotropy different in stiffness between the longitudinal direction of the tire code cl and the direction orthogonal to the direction.

In Step S2, a road surface model 8 is set.

Figure 6:
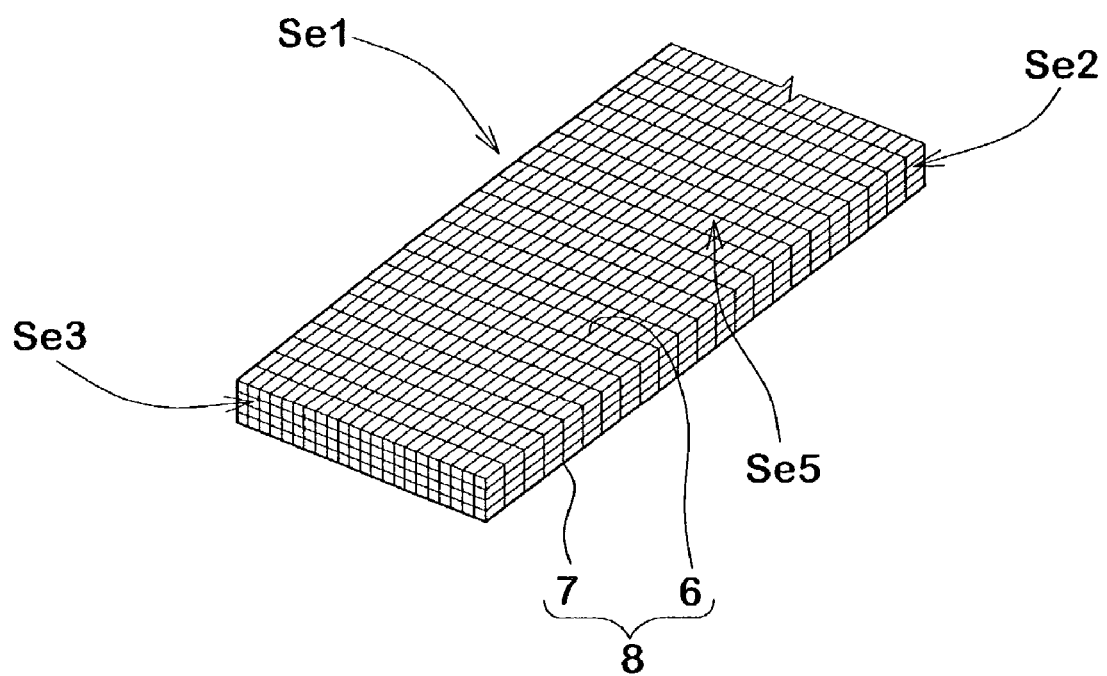
FIG. 6 is a perspective view which visualizes an example of the road surface model.
Figure 7:
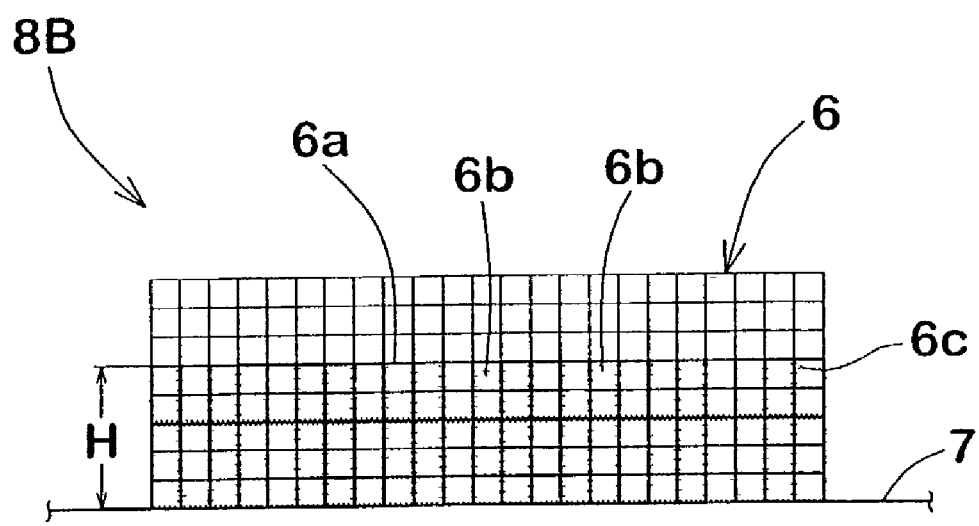
FIG. 7 is a side view of the snow material model.

FIGS. 6 and 7 show an example of the road surface model 8. The road surface model 8 is composed of the element 7 with a stiff surface which is to be the bottom surface, and the snow material model 6 disposed thereon. The snow material model 6 is made by modeling snow into elements capable of numerical analysis, and includes an element which causes a volume change due to compression and continues the volume change substantially permanent.

Figure 8:
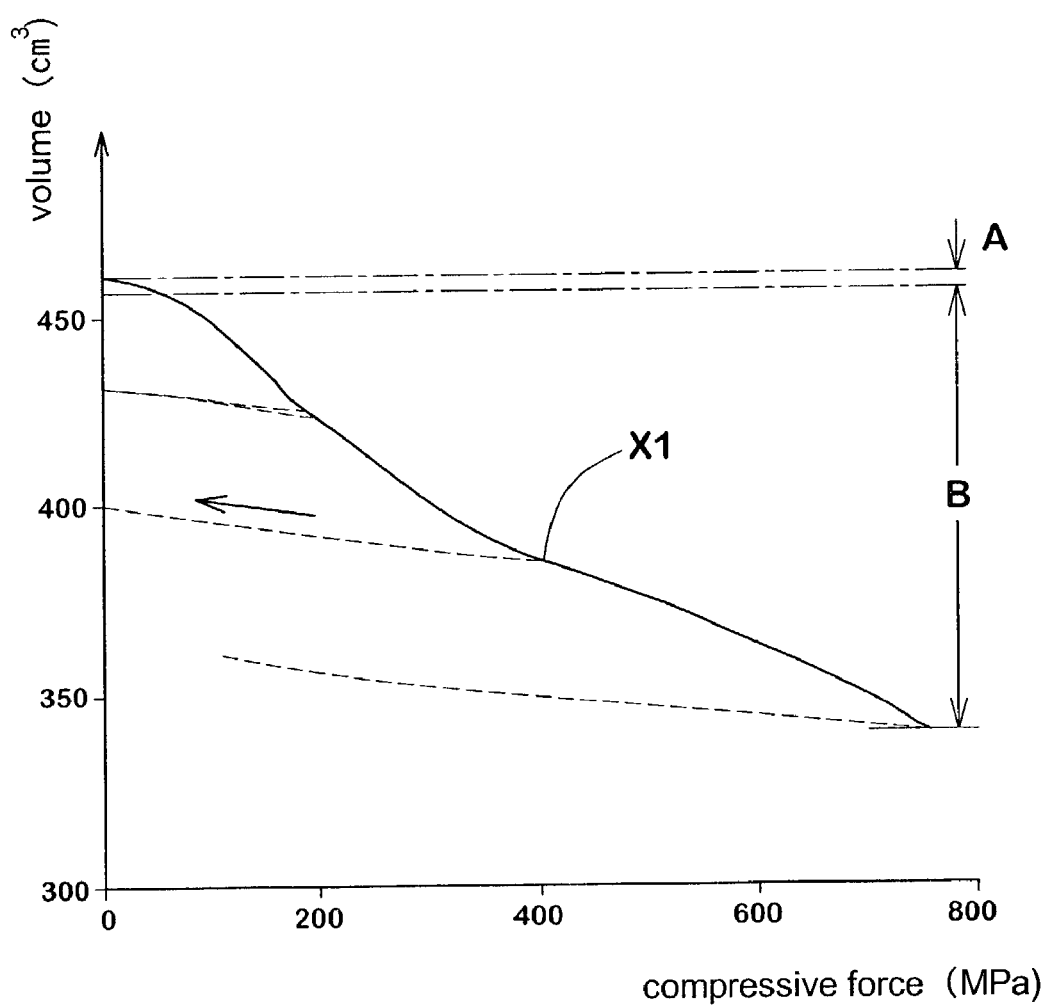
FIG. 8 is a graph showing the relation between the compressive force and volume of the snow material model.

The snow material model 6 exhibits the relation shown in FIG. 8 between its volume and compressive force (hydrostatic pressure compressive stress) acting on the snow material model 6. This relation has been found from experiments. As indicated by the solid line, the snow material model 6 decreases its volume in proportion to the growth of compressive force, which means it has compressibility. In the initial stage of compression, there is an elastic deformation region A where the volume keeps changing approximately linearly and the stress is in substantial proportion to the volumetric strain. The proportionality constant between the volumetric strain and the stress in the elastic deformation region A is a bulk modulus.

When a compressive force is applied over the elastic deformation region A so as to compress to X1 and then the load is removed, only the elastic strain is solved and the plastic strain is left as shown by the chain lines. In other words, the volume change due to compression continues permanent (plastic deformation region B). The three chain lines shown in the graph are all parallel to the inclination of the bulk modulus. This indicates that the snow material model 6 has a constant bulk modulus.

In the present embodiment, snow is modeled by an Eulerian element of, for example, hexahedron. An Eulerian element can be treated by finite volume method. The snow material model 6 is composed of the lattice-like mesh 6*a* fixed in the space on the element 7 with the stiff surface, and the imaginary filling material 6*c* corresponding to the snow filled into the cubic space 6*b* divided by the mesh 6*a*. The filling material 6*c* has the properties shown in FIG. 8. The thickness H of the filling material 6c is made to correspond to the thickness of the snow to be evaluated. The snow material model 6 has the width and length necessary for the rotation of the tire model 2; however, the model 6 is not restricted to an Eulerian element.

Figure 9A:
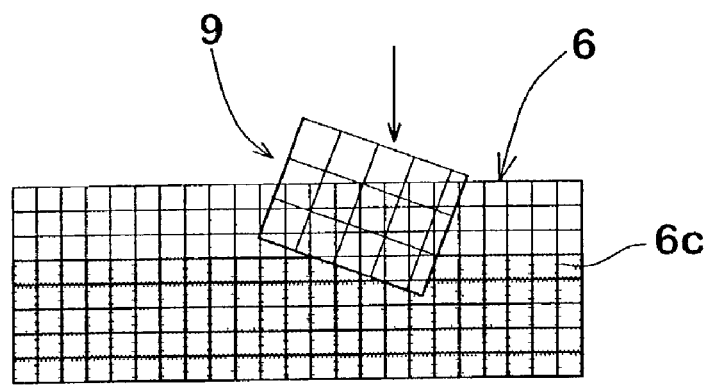
FIGS. 9A, 9B are side views showing deformations of the snow material model.
Figure 9B:
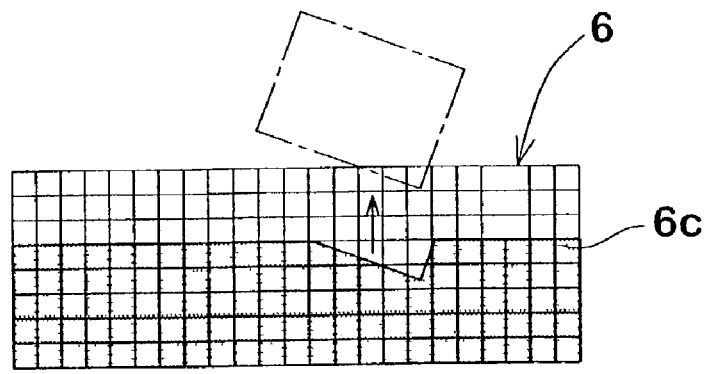

FIGS. 9A, 9B show the condition in which the snow material model 6 gets in contact with the tread block 9 of the tire model 2. In the deformation calculation of the snow material model 6, the filling material 6c which indicates the snow overlaying the tread block 9 is removed. The surface of the tread block 9 becomes the boundary of the two models, and the filling material 6c is left only its outside. The removed filling material 6c is calculated on the assumption that it has been compressed into each cubic space.

The volumetric strain of the snow material model 6 can be calculated element by element by comparing the volume of the filling material 6a between before and after the time increment for the deformation calculation. The compressive force to one element is transferred to adjacent elements in sequence so as to simulate a series of deformation condition.

Figure 10:
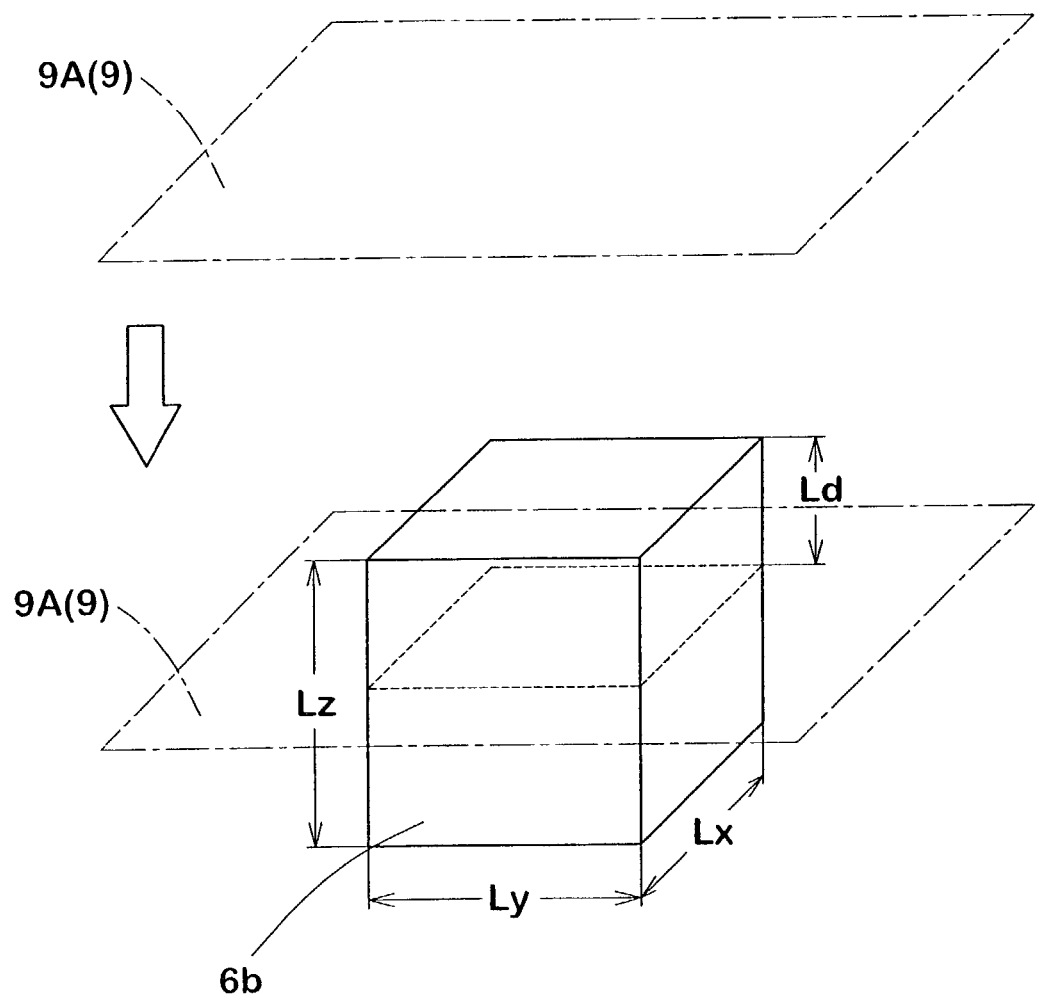
FIG. 10 is a diagrammatic view which explains the compression of the snow material model.

As shown in FIG. 10, one cubic space 6b of the snow material model 6 is filled with the filling material 6c corresponding to the snow of 100% of a volume V1 (=Lx×Ly×Lz) in the initial state. However, when the surface 9A of the tread block of the tire model 2 goes into this cubic space, the filling material 6c changes its volume to a volume V2, {(Lz−Ld)×Ly×Lx}. The volumetric strain of the filling material 6c (that is, snow) can be calculated by the volume ratio (V2/V1) of the filling material 6c before and after the change. The volumetric strain is the sum of the elastic volumetric strain which is decompressed after unloading and the plastic volumetric strain which is left even after unloading. As indicated by the chain lines in FIG. 8, the former is much smaller than the latter. When the tire model 2 is removed, the filling material 6c leaves the plastic volumetric strain as shown in FIG. 9B. Consequently, the snow material model 6 can express a volume change due to compression.

The element 7 with the stiff surface has rigidity which does not cause the surface to be deformed. In this embodiment, the element 7 checks the flow in and flow out of the filling material 6c through the bottom surface Se5 of the snow material model 6. The flow of the filling material 6c to and from the left and right sides Se1 and Se2, front side Se3, and rear side (not illustrated) of the snow material model 6 can be determined as needed. The filling material 6c can be flown in or out between the other part of the mesh 6a.

In Step S3, a boundary condition and other conditions are set.

The conditions to be set can include the rim and internal pressure of the tire model 2, the friction coefficient between the snow material model 6 and the tire model 2, the time increment in the initial stage of the deformation calculation, the bulk modulus of the snow material model 6, and the like.

Figure 11:
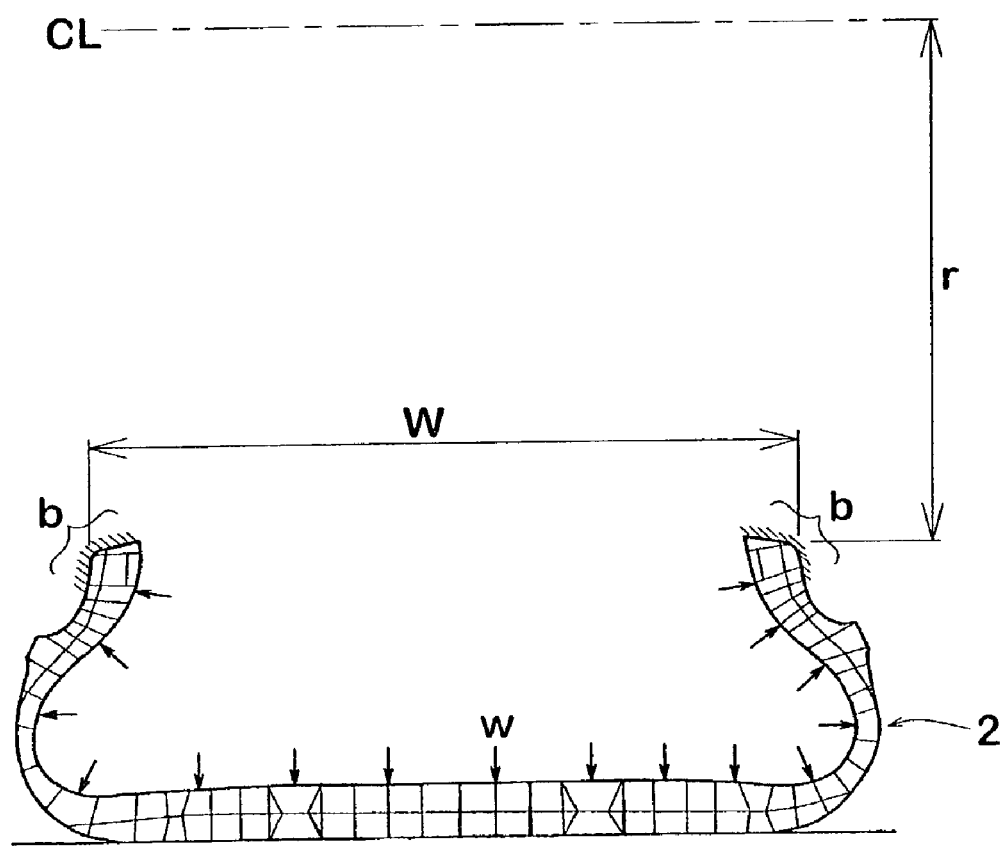
FIG. 11 is a cross sectional view which shows the rim assembly of the tire model.

FIG. 11 shows the imaginary rim assembly of the tire model 2. The tire model 2 restricts the contact regions b, b which are in contact with the imaginary rim so that the width W can be displaced to be equal to the imaginary rim width. The distance r in the direction of the radius of the tire between the imaginary rotation axis CL of the tire model 2 and the restricted regions b is set to be equal to the imaginary rim diameter. The internal pressure is expressed by making the uniformly distributed load w which is the same as the internal pressure of the tire act on the internal surface of the tire model 2.

In the present example, explicit method is adopted for the calculation of the simulation.

According to explicit method, the moment that the load or the like is acted on each model is made the time 0, and time is divided at intervals of set time increment so as to find the displacement of the model at each point in time. Explicit method does not involve convergent calculation. Therefore, the time increment is so set as to satisfy the Courant condition, thereby stabilizing the calculation results. To be more specific, the initial time increment Δt in the deformation calculation of the tire model 2 and snow material model 6 is set at the values which meet the following formula.

$$\Delta t < Lmin/C$$

Figure 12:
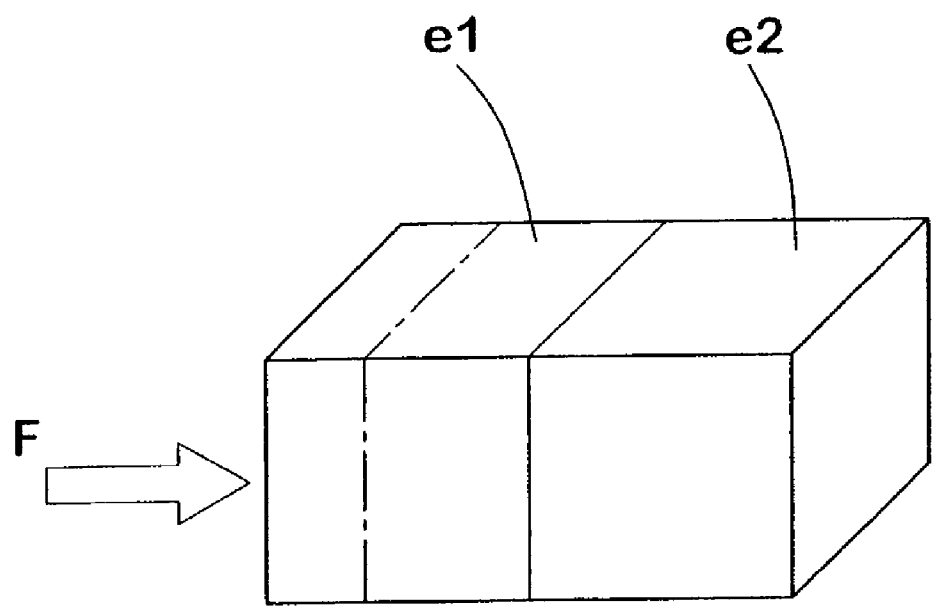
FIG. 12 is a perspective view of the element.

"Lmin" is a typical length of the smallest element in each model, and "C" is the propagation rate of the stress wave propagating in the structure (in the case of 2-D, $(E/\rho)^{0.5}$ (E: Young's modulus, ρ: density). In the deformation calculation with the time increment which satisfies the Courant condition, as shown in FIG. 12, it becomes possible to calculate the deformation condition of the element e1 when an outer force F is acted thereon before the outer force F is transferred to the element e2 adjacent to the element e1. This helps to obtain stable solutions. The initial time increment is preferably 0.1 to 5 μsec, more preferably 0.3 to 3 μsec, and most preferably 0.5 to 2 μsec for both the tire model 2 and snow material model 6.

In Steps S4 and S5, the tire rolling simulation is done by performing the deformation calculation of the tire model 2 and snow material model 6 every minute time increment while the tire model 2 is made to be in contact with the snow material model 6 so as to provide rotating conditions. The conditions can include the axial load acting on the tire model 2, the slip angle during the rotation, a camber angle and/or a rolling speed, and the like. In the present example, the tire model 2 in contact with the snow material model 6 is supplied with a predetermined speed (translation speed, rotation speed) and is made to rotate on the snow material model 6.

As apparent from Steps S4, S5, S6, S7, and S8, in the present embodiment, the deformation calculation of the tire model 2 and the deformation calculation of the snow material model 6 are conducted separately. In Step S8 the shape and speed data of the tire model 2 obtained from the deformation calculation of the tire model 2 are given as the boundary condition for the deformation calculation of the snow material model 6. In Step S7 the shape, speed, reaction force of the rolling surface obtained from the deformation calculation of the snow material model 6 are given as the boundary condition for the deformation calculation of the tire model 2. The details will be explained as follows.

Figure 13:
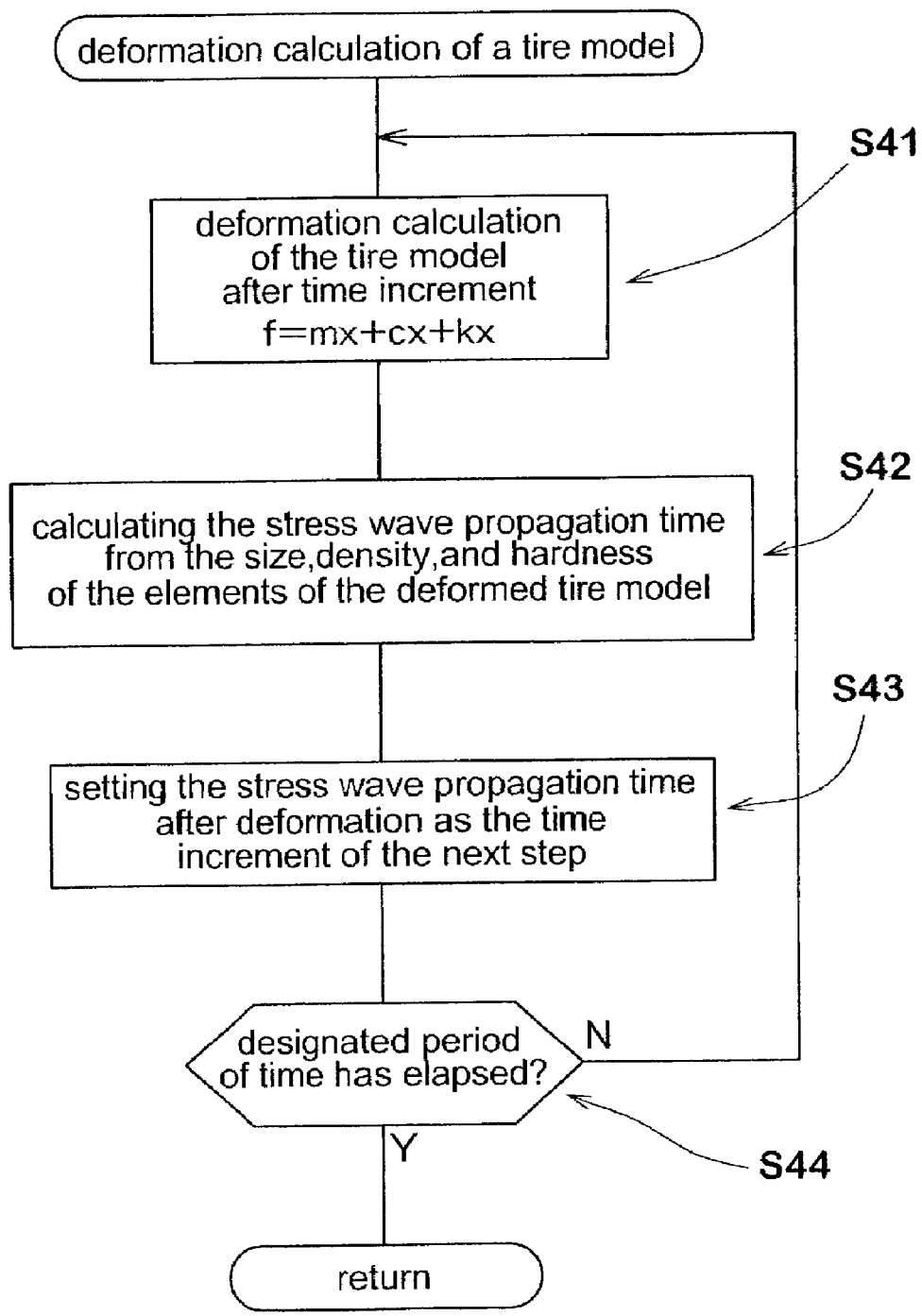
FIG. 13 is a flowchart showing an example of the deformation calculation of the tire model.

FIG. 13 shows an example of the deformation calculation of the tire model 2.

In Step S41, the deformation calculation after the time increment Δt is performed first. The deformation calculation in the present example is done by finite element method using the following equation (1)

$$F = M\ddot{x} + C\dot{x} + Kx \quad (1)$$

In the equation (1), "F" is an outer force matrix, "M" is a mass matrix, "C" is an attenuation matrix, "K" is a stiffness matrix, "x" is a displacement matrix, "ẋ" is a speed matrix, "ẍ" is an acceleration matrix.

In Step S42, the stress wave propagation time of each element of the deformed tire model 2 is calculated based on its size and density. Then, the time increment calculated from the minimum value of this stress wave propagation time is set as the time increment for the next deformation calculation. Since the stress wave propagation time is the function of the size and density of the element, it changes every time the element deforms. In the present embodiment, the optimum time increment can be set in accordance with the deformation of the element, which enables the deformation calculation of the tire model 2 to be performed more accurately.

In Step S44, it is checked whether the predetermined period of time has been elapsed or not. When "NO" is selected in Step S44, the process goes back to Step S41 to perform a calculation by adding the newly set time increment. When "Yes" is selected in Step S44, the process goes back to Step S6 after the deformation calculation of the tire model 2 has been terminated.

Figure 14:
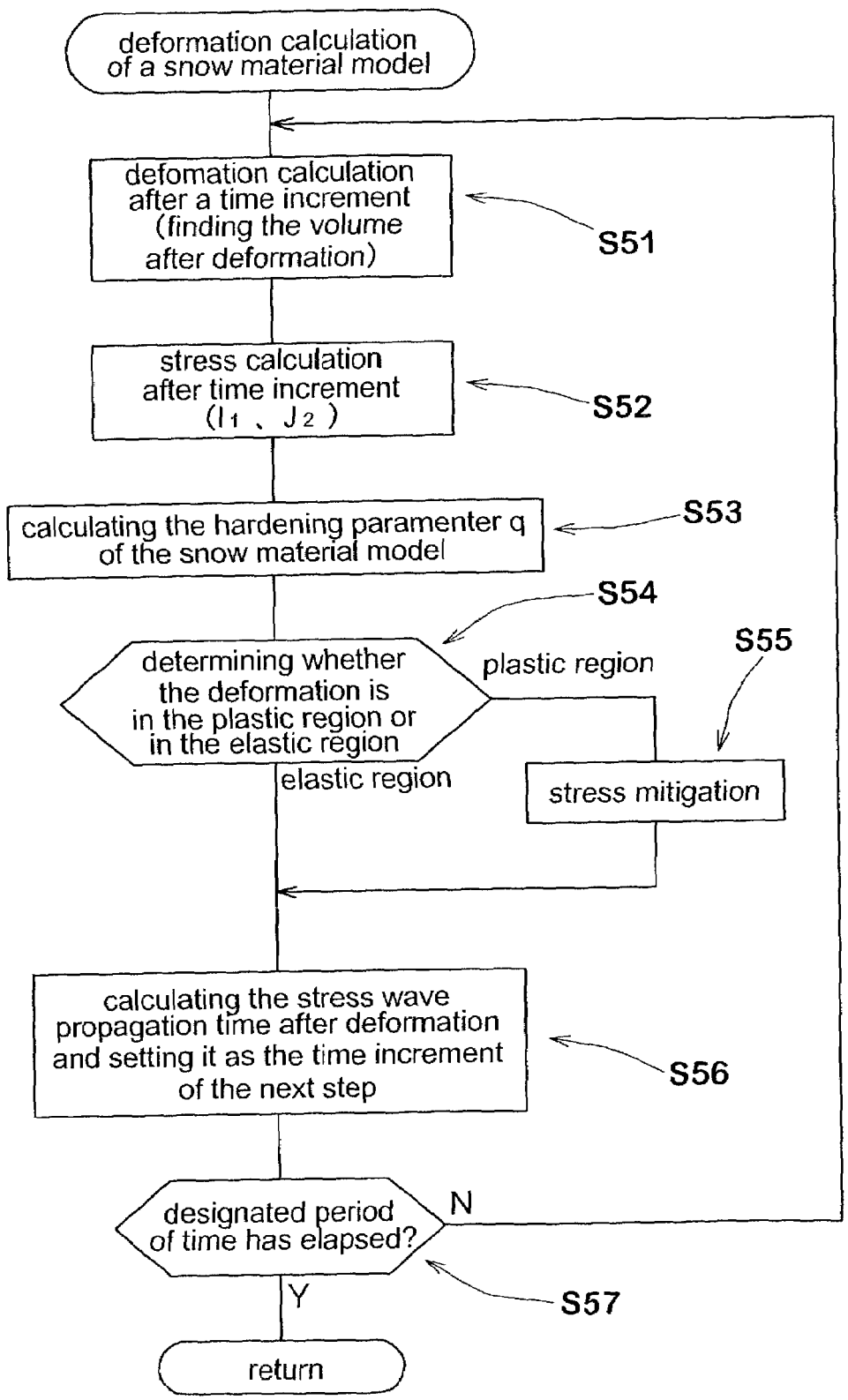
FIG. 14 is a flowchart showing an example of the deformation calculation of the snow material model.

FIG. 14 shows an example of the deformation calculation of the snow material model 6.

In Step S51 the deformation calculation is done for each element of the snow material model 6 after the time increment. In the deformation calculation, the volume of each deformed element is found from the following equation in the present embodiment. To be more specific, the pressure to the snow material model is calculated from the boundary condition of the tire model, and the volume of each element of the deformed snow material model is found from the following equation (2) and the deformation conditions are designated.

$$P = K \cdot \epsilon \qquad (2)$$

In the equation (2), "P" is a pressure, "k" is a bulk modulus, and $\epsilon$ is a volumetric strain.

In Step S52, the stress calculation of the snow material model 6 after the time increment is performed. In this stress calculation, the first invariant $I_1$ of the stress tensor and the second invariant $J_2$ of the stress tensor of each element of the snow material model 6 are calculated. The first invariant $I_1$ of the stress tensor and the second invariant $J_2$ of the stress tensor are parameters which determine the yield function of the snow material model 6. The first invariant $I_1$ of the stress tensor is found from the sum of the principal stress σ1, σ2, and σ3. On the other hand, deviatonic stresses are obtained by subtracting hydrostatic pressure component (σm={(σx+σy+σz)/3}) from each of the normal stresses, σx, σy, and σz of each axis. Each of the deviatonic stress σx', σy', and σz' is calculated by the following equation.

σx'=σx−σm

σy'=σy−σm

σz'=σz−σm

The second invariant $J_2$ of the stress tensor is calculated by the following equation from the above deviatonic stresses.

$J_2$=σx'·σy'+σy'·σz'+σz'·σx'−τxy²−τyz²−τzx²

In this equation, τxy, τyz, and τzx are shearing stresses.

In Step S53, a hardening parameter "q" of each element of the snow material model 6 is calculated. The hardening parameter q is one of the parameters which determine the yield function of the elements of the snow material model 6. The hardening parameter q can be calculated using, for example, the following equation (3) or (4) obtained from the results of experiments.

$$q = -\frac{1}{2a}\ln\left(1 + \frac{\alpha}{b}\right) \quad 0 \le -\alpha \le f \cdot b \qquad (3)$$

$$q = \frac{1}{2a}\left[\frac{-\alpha - fb}{b(1-f)} - \ln(1-f)\right] \quad -\alpha > f \cdot b \qquad (4)$$

In these equations, "q" is the hardening parameter of snow at the time of compression, "a" and "b" are empirical constants, "f" is a coefficient for preventing the inside of "( )" of ln from becoming 0 when α=b, and "α" is a plastic volumetric strain.

As apparent from the two equations, the hardening parameter q of two kinds is prepared, and is so set as to become harder with increasing compression of the elements of the snow material model 6. The above "f" is preferably a number smaller than 1 and close to 1 such as 0.90 to 0.99. The hardening parameter is not restricted to such an empirical formula, but can be varied widely.

Figure 15:
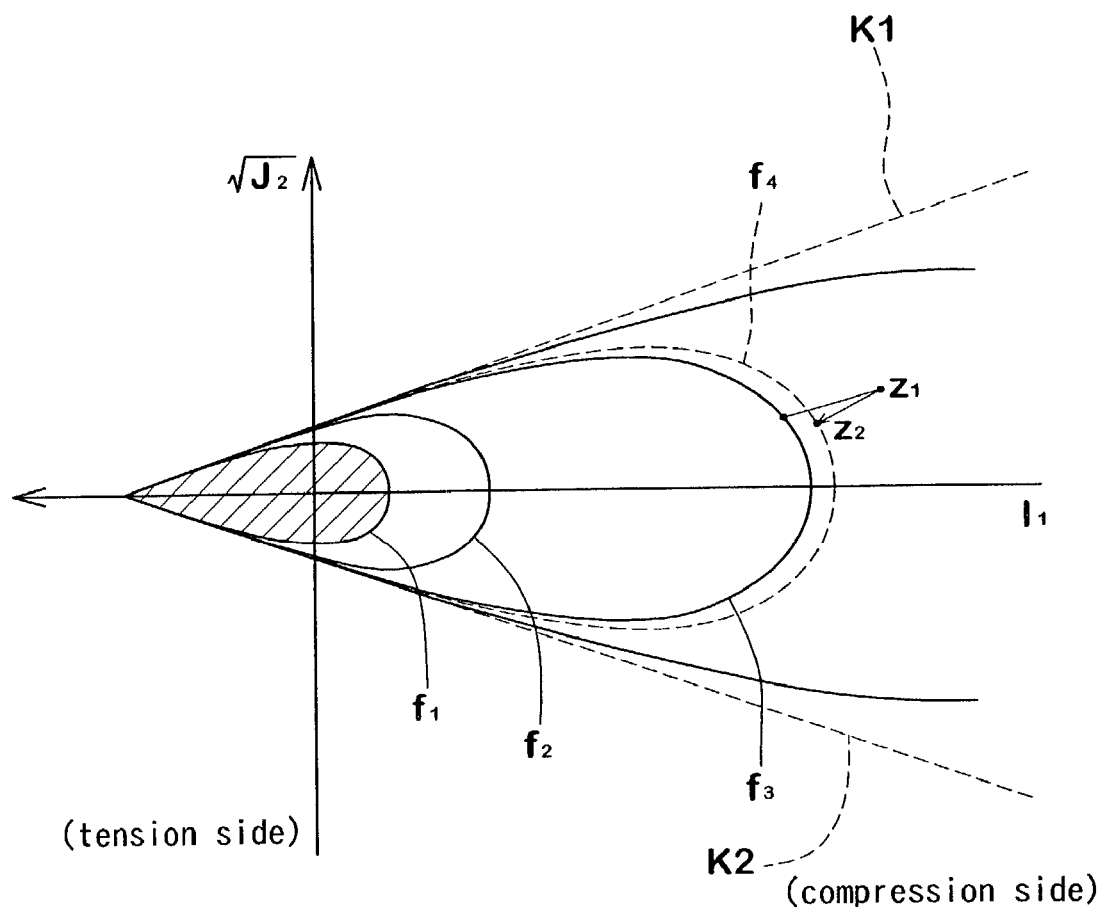
FIG. 15 is a graph which explains yield function.

In Step S54, whether the deformation of each element of the snow material model 6 is in the plastic region or elastic region can be determined based on the yield function. The yield function is set by using the first invariant $I_1$ of the stress tensor, the second invariant $J_2$ of the stress tensor, and the hardening parameter q. FIG. 15 is a graph showing the relation between the square root of the second invariant $J_2$ of the stress tensor of the elements of the snow material model and the first invariant $I_1$ of the stress tensor. The two straight lines K1, K2 indicated by the chain lines are Drucker-Prager failure surface. The yield function (also referred to as yield surface) of the snow material model 6 is given as lateral drop-like curves $f_1$, $f_2$, $f_3$ - - - . The condition of the elements of the snow material model 6 is in the elastic region when it is inside the yield function f, and is in the plastic region when it is outside (the elastic region for the yield function $f_1$ is indicated by a hatch pattern). This yield function is given as the following equation (5).

$$f_c(I_1, J_2, q_c(\alpha_c)) = \sqrt{J_2 + \frac{c_c}{q_c}(\bar{I}_1 + q_c)^4} - k_c\bar{I}_1 - \sqrt{c_c q_c^3} \le 0 \qquad (5)$$

$$f_t(I_1, q_t(\alpha_t)) = \frac{\bar{I}_1}{3} - q_t$$

$$\bar{I}_1 = T - I_1$$

In this equation, "$I_1$" is the first invariant of the stress tensor, "$J_2$" is the second invariant of the stress tensor, "T" is a parameter about the bonding of snow, "q" is the hardening parameter, "k" is a material parameter related to a friction angle, the subscript "c" indicates the time of compression, and the subscript "t" indicates the time of tension. The yield function of the snow material model 6 is the function of the first invariant $I_1$ of the stress tensor, the second invariant $J_2$ of the stress tensor, and the hardening parameter q. Therefore, the shape changes as shown in FIG. 15 in accordance with these parameters.

In a deformation condition of the elements of the snow material model 6, the first invariant $I_1$ of the stress tensor, the second invariant $J_2$ of the stress tensor, and the hardening parameter q are designated. By using them, one yield function f is set from the equation (5). It can be determined whether the deformation of the elements is in the elastic region or plastic region from the coordinates plotted by the first invariant $I_1$ of the stress tensor and the second invariant $J_2$ of the stress tensor, and the boundary condition f.

In Step S54 when it has been determined that the deformation of the elements of the snow material model 6 is in the plastic region, a process to ease the stress is conducted in Step S55. In the deformation calculation of an object, the elastic deformation can be comparatively easily calculated because the stress and strain are in proportion to each other. However, in the deformation calculation of the snow material model 6 having a large plastic deformation, it is difficult to obtain the stress at the time of plastic deformation as stable solutions. Therefore, in the present embodiment, when it has been determined that the deformation of the snow material model 6 is in the plastic region, the stress of the elements is returned to a stress value within the elastic limits. To be more specific, in the case where the yield function at Step t is $f_3$ shown in FIG. 15, if the yield function calculated in next Step (t+1) is $f_4$ and the stress condition is Z1, the stress condition is returned to Z2 on the yield function $f_4$. As such stress mitigation, there are various approaches which could be adopted; for example, radial return method is preferable. This process enables a stable simulation. It also helps to take the plastic deformation of the snow hardened by tires or interaction including the influence of the plastic deformation on the rolling of tires into the computer.

In Step S56, the stress wave propagation time of each element of the deformed snow material model 6 is recalculated. In this step, the minimum value of the stress wave propagation time is set as the next time increment. In Step S57 it is checked whether the predetermined period of time has elapsed or not. When it has not, the process goes back to Step S51 and calculation is performed again with the newly set time increment. When it has elapsed, the deformation calculation of the snow material model 6 is terminated to return to Step S6.

In Steps S7 and S8, from the results of the individual calculations of the tire model 2 and snow material model 6, necessary data are exchanged between these models so as to couple them. For example, for the next deformation calculation of the tire model 2, the shape, speed, and pressure of the snow material model 6 are given as conditions. On the other hand, for the next deformation calculation of the snow material model 6, the shape and speed of the tire model 2 are given as conditions. The coupling is performed when the tire model 2 and snow material model 6 are at the same point in time.

Therefore, it becomes possible for the snow material model 6 to calculate new changes in the compressive force due to changes in the position or shape of the tire model 2. For the tire model 2, it becomes possible to calculate a new deformation due to the reaction force received from the snow material model 6. Repeating these calculations can analyze the conditions of deformation of the tire model 2 and snow material model 6 which change every moment.

In Step S6 it is determined whether the predetermined period of time which indicates the completion of calculation has elapsed or not. When "YES" is selected in Step S6, the calculation results are outputted in Step S9. The time for the calculations in Step S6 to be completed can be determined according to the simulation to be executed so as to obtain stable calculation results.

The outputs of the calculation results can contain various kinds of information. For example, when the tire model 2 is given a driving force (or a braking force), the force applied on the snow material model 6 in the progress direction can be taken out. This helps to evaluate and improve the driving performance (or braking performance) of the tire on a snowy road. When the tire model 2 is driven on the snow material model 6 by giving a slip angle, the lateral force applied on the tire model 2 can be outputted. This helps to evaluate and analyze the cornering performance of the tire on a snowy road.

From the outputted results, investigators can perform the modification of the internal structure or profile of tires, or the improvement of patterns or rubber materials. It is also possible to prototype the tires which have shown preferable simulation results. This greatly accelerates the period of development of winter tires, thereby reducing the development cost. In addition, evaluation of practical vehicle can be applied to prototypes of tires so as to manufacture the tires with excellent results.

Figure 16:
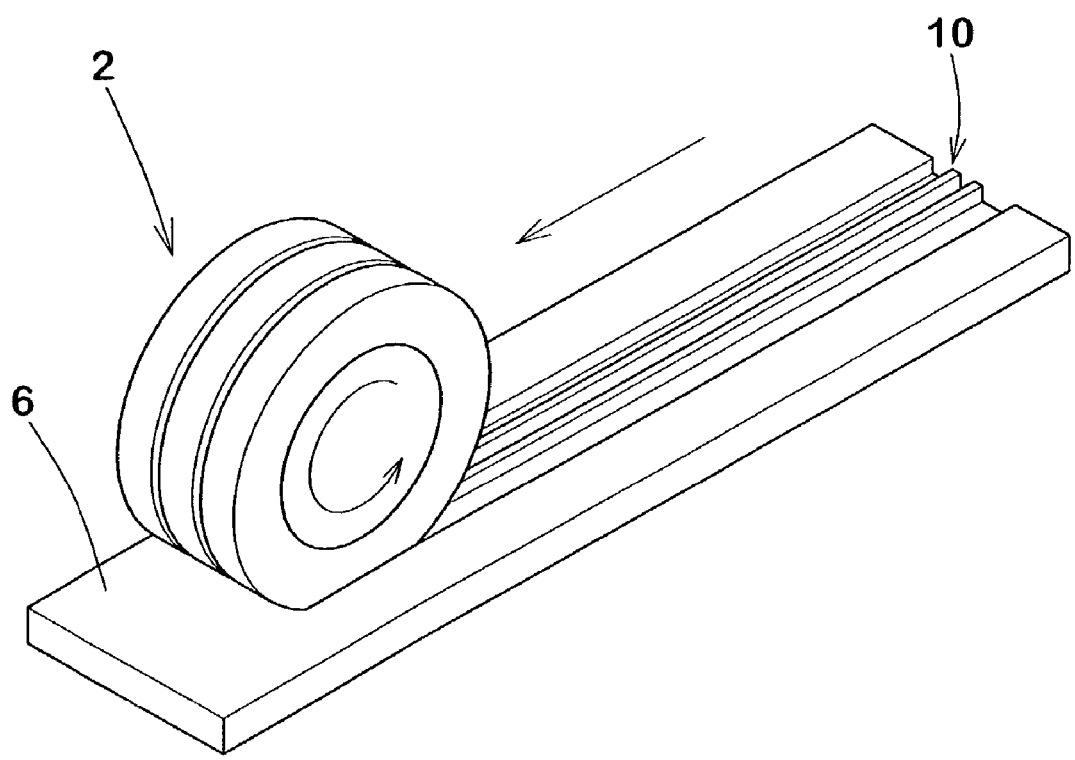
FIG. 16 is a diagrammatic view which visualizes the rolling simulation.
Figure 17:
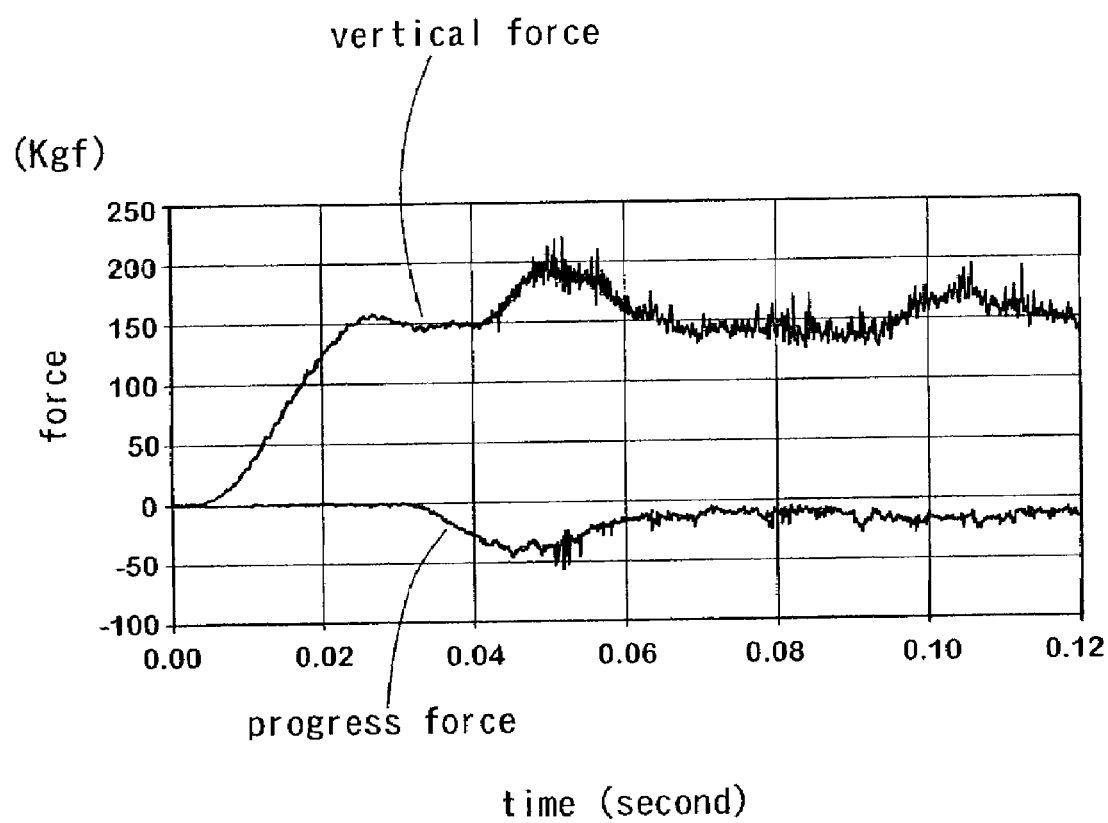
FIG. 17 is a graph showing the results of the rolling simulation.

FIG. 16 shows a visualized example of the simulation. The snow material model 6 has a rut 10 which is caused when the tire model 2 is driven thereon. FIG. 17 shows the relation between the force in the progress direction of road contact plane of the tire model 2, the force in the direction of the radius of the plane of tire model 2, and the time in the simulation. It is known that a stable driving force and a reaction force are obtained about 0.04 seconds after the initiation of rolling.

The simulation could be also performed in such a manner that like an indoor test for tires, the imaginary rotation axis CL of the tire model 2 is so fixed as to be able to rotate only in the space (the space refers to the whole coordinate system to be analyzed) and that the road surface model 8 is moved toward the rear in contact with the tire model 2. It must be noted that since the snow material model 6 is an elastic-plastic material with compressibility, providing such a speed might cause vibration on the calculation results. To avoid this, in the present embodiment, the road surface model 8 is fixed in the space and the tire model 2 with rotation speed and translation speed is moved thereon.

Figure 18:
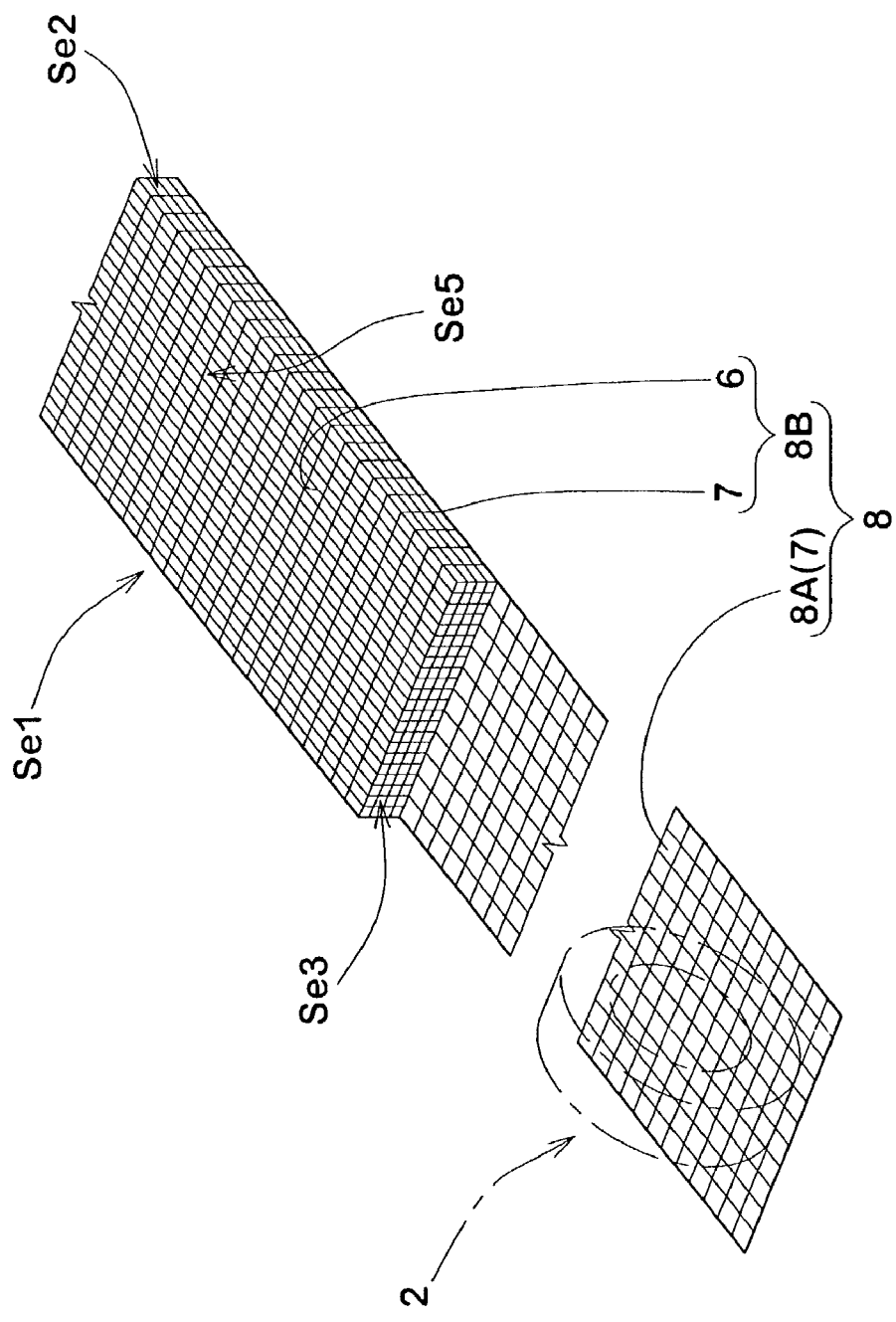
FIG. 18 is a perspective view of the road surface model in another embodiment.
Figure 19:
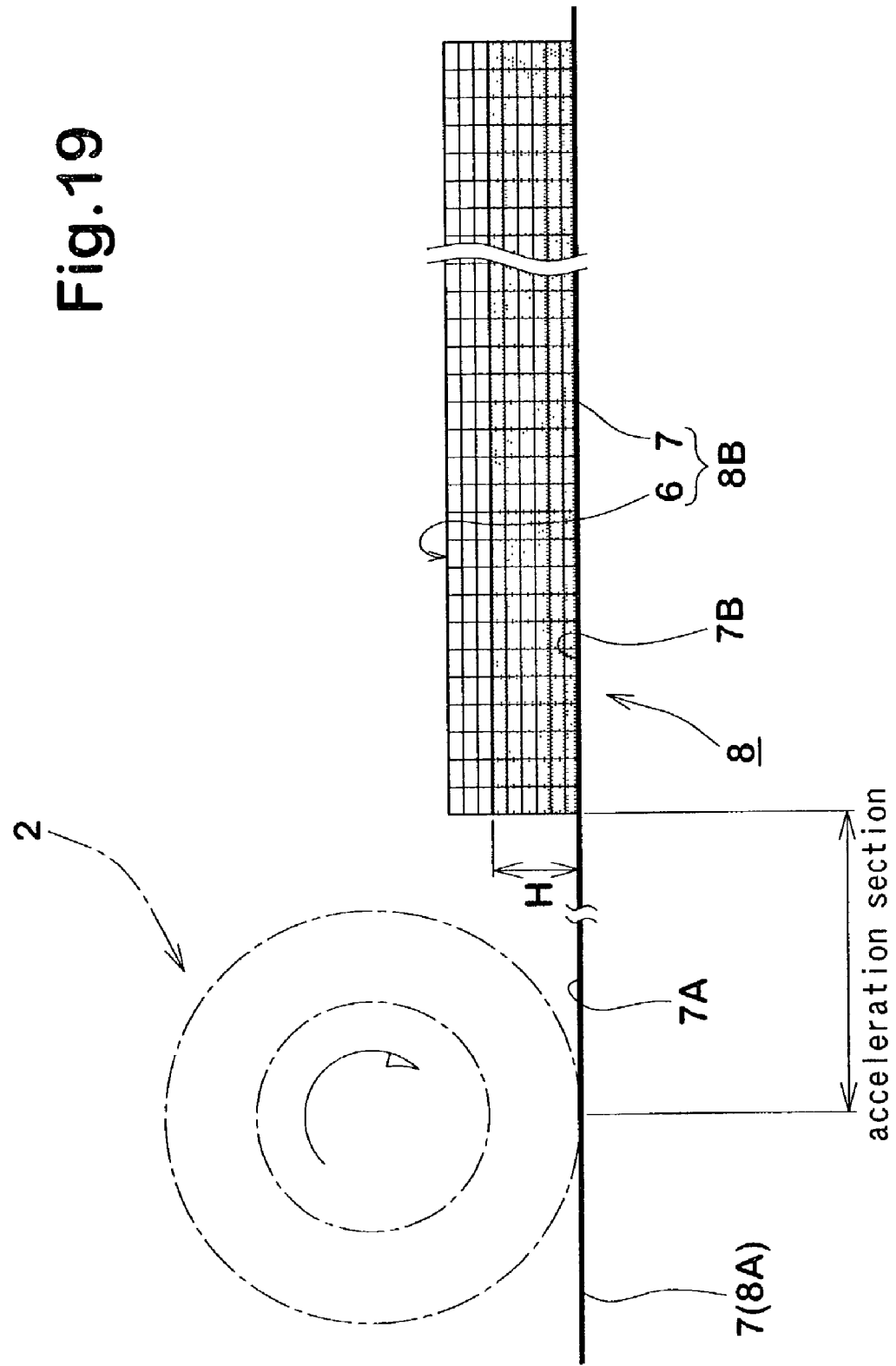
FIG. 19 is side views of the tire model and road surface model.

FIGS. 18 and 19 show another embodiment of the road surface model 8.

The road surface model 8 of the present embodiment includes the first road-surface part 8A on which the tire model 2 rolls first and the second road-surface part 8B on which the tire model 2 rolls the next. The second road-surface part 8B is disposed behind the first road-surface part 8A in the direction of travel so as to be contiguous with the part 8A. The first road-surface part 8A is composed exclusively of the element 7 with a stiff surface, without the snow material model 6 on the rolling surface. On the other hand, the second road-surface part 8B is composed of the element 7 with a stiff surface which is to be the bottom surface and the snow material model 6 arranged thereon to form the rolling surface.

In rolling simulation of tire, the tire model 2 is generally rotated at a predetermined evaluation speed, and the reaction force from the road surface, the force in the progress direction and the like are calculated. On the other hand, the tire model 2 is generally modeled at rest. For the accurate rolling simulation, the shape of the tire model 2 is preferably changed in accordance with the evaluation speed. In the present embodiment, the tire model 2 at rest is accelerated up to the evaluation speed by using the first road-surface part 8A. Consequently, the first road-surface part 8A is formed with the length necessary for the tire model 2 to be accelerated up to the predetermined evaluation speed. The length of the first road-surface part 8A is properly determined by the evaluation speed, accelerating speed, the friction coefficient between the element 7 with a stiff surface and the tire model 2, the outer diameter of the tire model 2, and other conditions. The first road-surface part 8A can simplify the deformation calculation of the tire model 2 because of the absence of the snow material model 6, thereby greatly reducing the accelerating simulation. When the tire model 2 has reached the evaluation speed, the tire model 2 moves from the first road-surface part 8A to the second road-surface part 8B and gets in contact with the snow material model 6. In the case shown in FIG. 19, the bottom surface 7B of the second road-surface part 8B forms a plane surface with the rolling surface 7A of the first road-surface part 8A, thereby causing a level difference equal to the thickness H of the snow model 6. When the tire model 2 moves from the first road-surface part 8A to the second road-surface part 8B having the snow material model 6, the presence of the level difference might cause a large force in the progress direction due to a collision.

Figure 20:
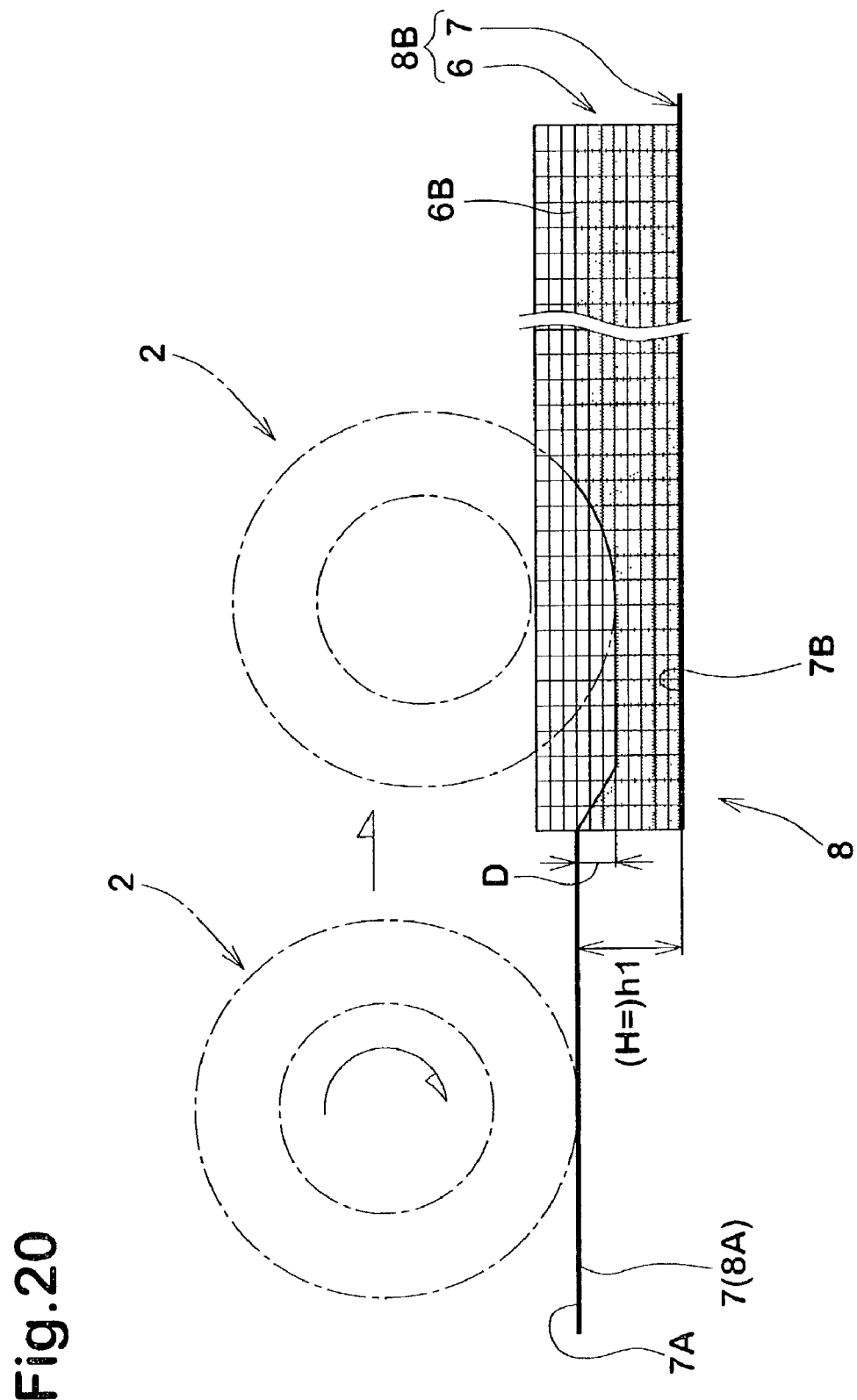
FIG. 20 is a side view of the road surface model in another embodiment.

FIG. 20 shows further another embodiment of the road surface model 8.

In this example, the bottom surface 7B of the snow material model 6 of the second road-surface part 8B (the surface of the element 7 with a stiff surface) is lower than the rolling surface 7A of the first road-surface part 8A (the surface of the element 7 with a stiff surface) by h1. This can reduce the level difference formed by the snow material model 6 while keeping the thickness H of the snow material model 6.

The height h1 can be variously determined in accordance with the thickness of the snow material model 6 to be set or other conditions. For example, in FIG. 20, the height hi and the thickness H of the snow material model 6 are made equal. This makes the rolling surface 6B of the snow material model 6 substantially form a plane surface with the rolling surface 7A of the first road-surface part 8A, thereby mitigating the force in the progress direction due to the initial contact between the tire model 2 and the snow material model 6.

Figure 21:
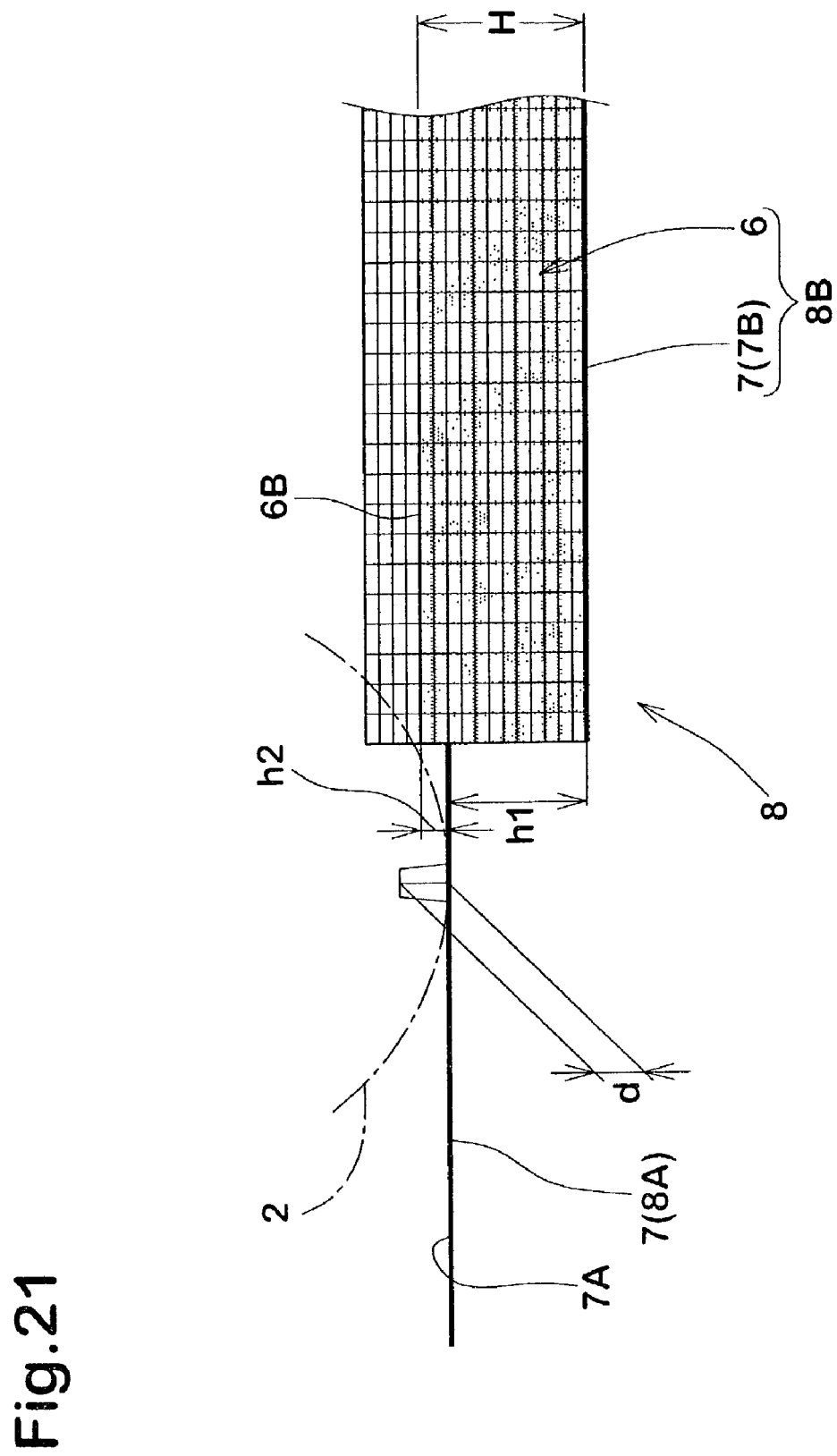
FIG. 21 is aside view of the road surface model in further another embodiment.

FIG. 21 shows further another embodiment of the road surface model 8.

In this example, the rolling surface 6B of the snow material model 6 of the second road-surface part 8B is higher than the rolling surface 7A of the element 7 with the stiff surface in the first road-surface part 8A by h2 ($\neq 0$). The height h2 is made preferably the same, or more preferably smaller than the depth of the tread grooves of the tire model 2. In the case shown in FIG. 20, the snow material model 6 is compressed by the tire model 2, and the rolling surface 6B drops. This causes a displacement D in the vertical direction in the tire model 2. The case shown in FIG. 21 is preferable in terms of making the displacement D small.

Figure 22:
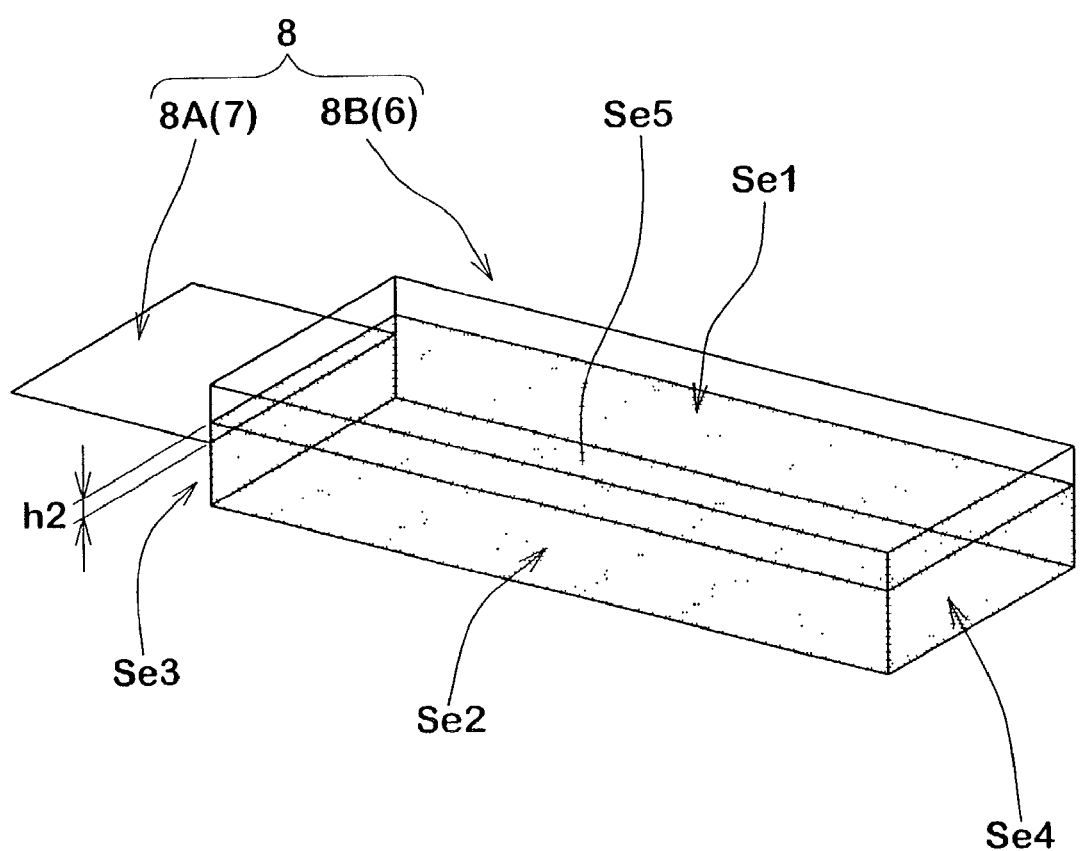
FIG. 22 is a side view of the road surface model in further another embodiment.

FIG. 22 shows further another embodiment of the road surface model 8.

In this example, the second road-surface part 8B is composed exclusively of the snow material model 6. The snow material model 6 is given the boundary condition at least on the bottom surface Se5 for checking the flow of the filling material 6c. As a result, the road surface model having the same function as those shown in FIGS. 19 to 21 can be set.

Another example of the deformation calculation of the snow material model 6 will be described as follows.

Figure 23:
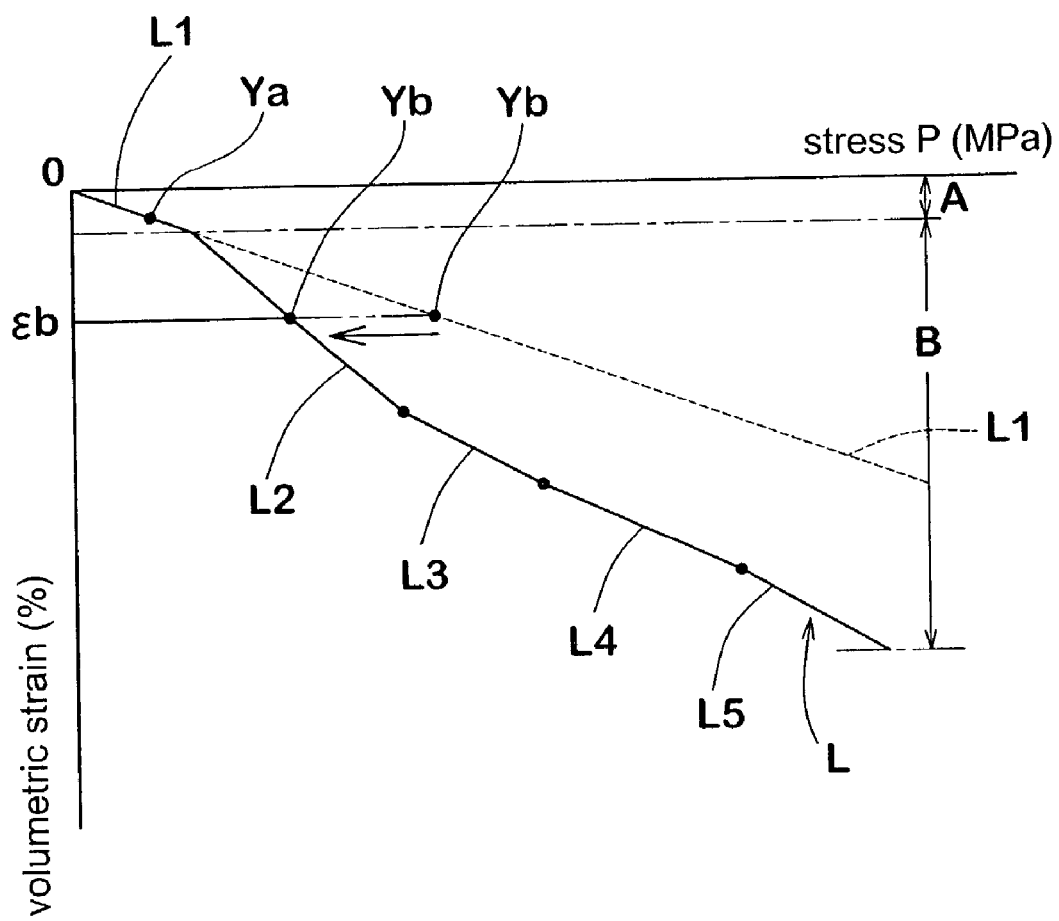
FIG. 23 is a graph which shows the relation between the volumetric strain and stress of the snow material model.

In the present embodiment, as shown in FIG. 23, the characteristic curve L indicating the relation between the stress and volumetric strain of the snow material model 6 is set in advance. As this characteristic curve L, an approximation curve which is closely analogous to the stress-volumetric strain curve to be calculated from the results of a compression test of snow (FIG. 8) is used. This characteristic curve L is stored in the computer 1 as a function, numerical data, or the like.

The characteristic curve L includes the elastic deformation region A and the plastic deformation region B. In the elastic deformation region A, the characteristic curve L is composed of a single straight line L1. In the plastic deformation region B, the characteristic curve L is a broken line composed of straight lines L2 to L5 having different inclinations. This broken line is closely analogous to the experiment results shown in FIG. 6. The inclinations of the straight lines L2 to L5 (that is, the inclinations which become the bulk modulus in the elastic region) are all smaller than the bulk modulus in the elastic deformation region A.

Figure 24A:
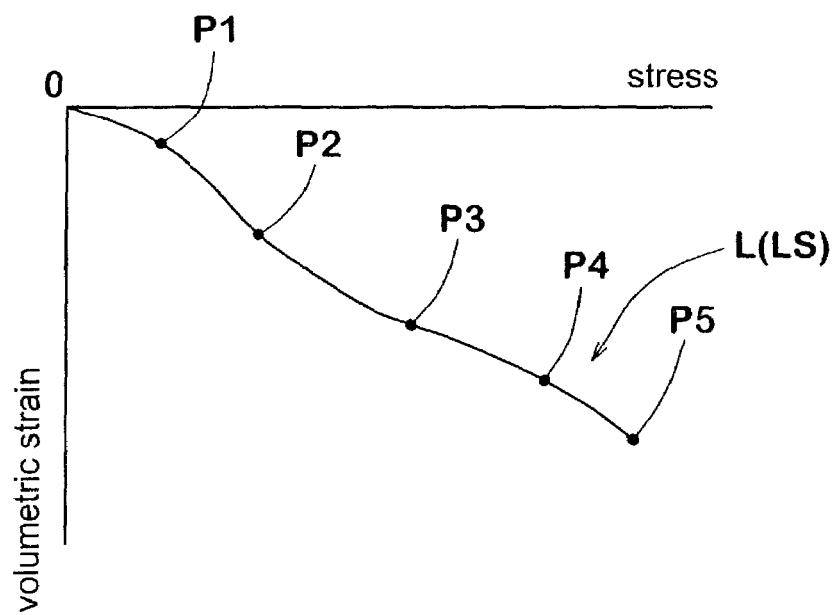
FIGS. 24A, 24B are graphs which show the relation between the volumetric strain and stress of the snow material model.
Figure 24B:
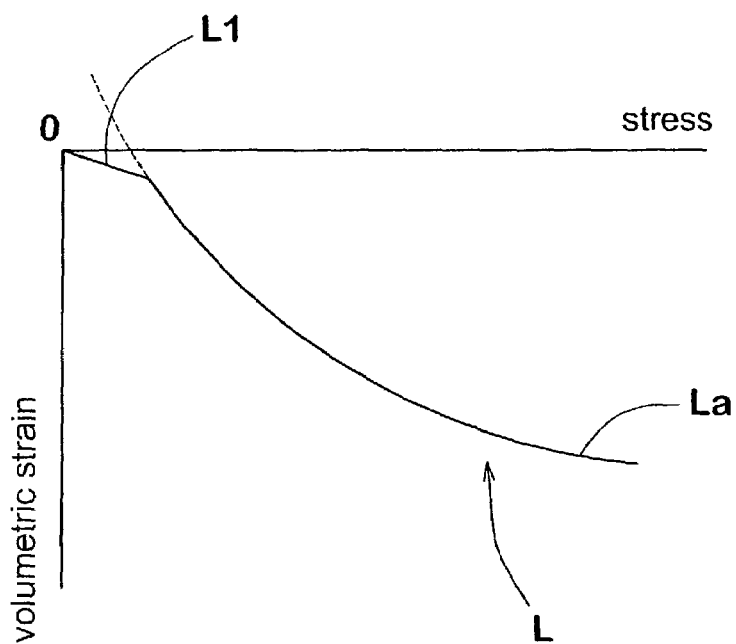

As shown in FIG. 24A, the characteristic line L can be the spline curve LS which smoothly interpolates between the control points P1, P2 . . . on the coordinate based on the experiment values, or can be the logarithmic curve La as shown in FIG. 24B. In FIG. 24B the logarithmic curve La and the straight line L1 are combined to form the characteristic curve L.

Figure 25:
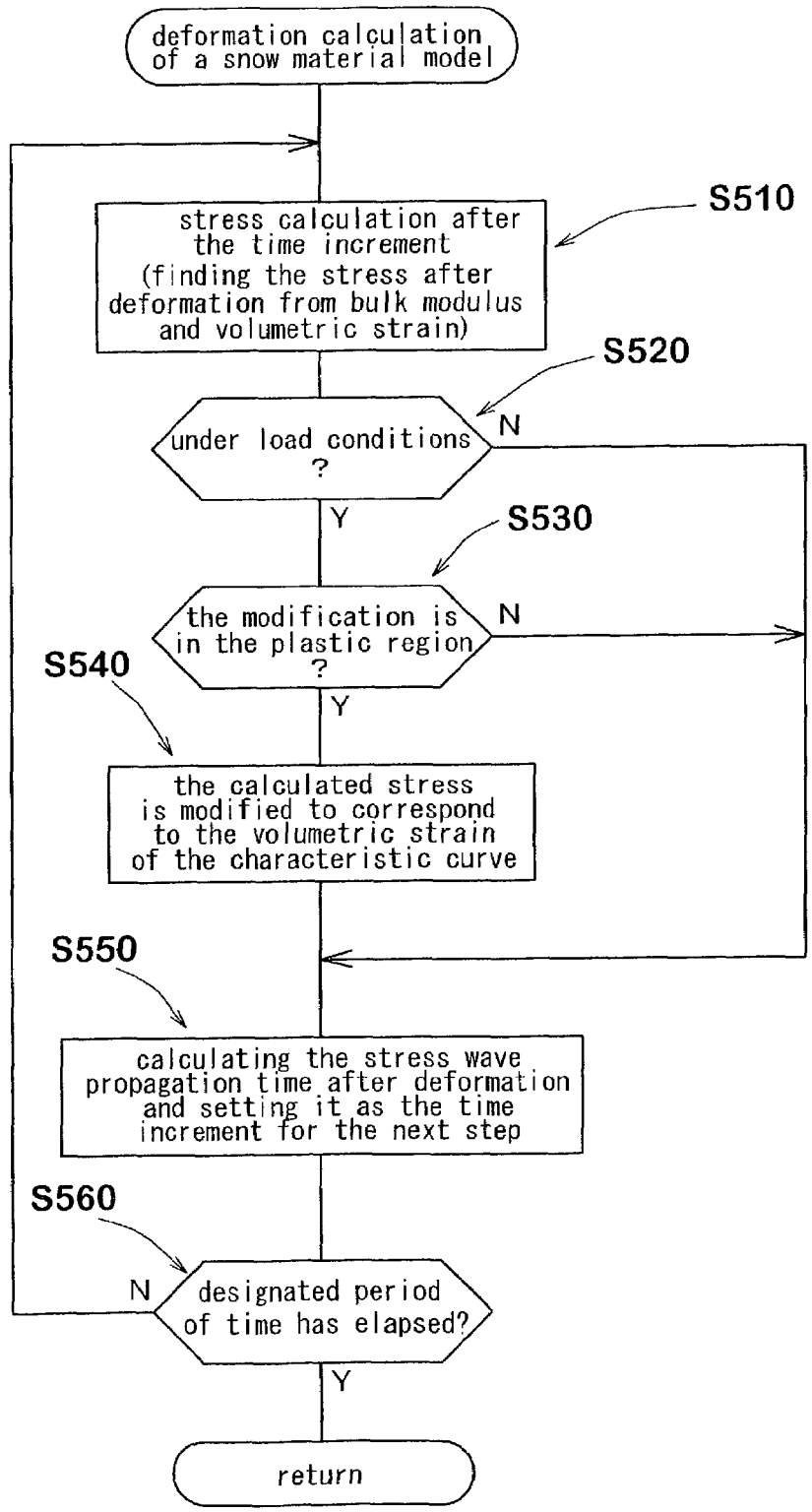
FIG. 25 is a flowchart showing another example of the deformation calculation of the snow material model.

FIG. 25 shows an example of the deformation calculation of the snow material model 6 using the characteristic curve. First, in Step S510 the stress calculation is applied to each element of the snow material model 6 after the time increment. The stress calculation is done based on the above equation (2).

In Step S520, it is determined whether the deformation of the elements of the snow material model 6 is under load conditions or no-load conditions. The load conditions referred to here indicate relative load conditions using the deformation condition of the elements obtained in the former calculation step as the reference (only compression is considered, but not tensile). The no-load conditions are relative no-load conditions using the deformation condition of the elements obtained in the former calculation step as the reference (non-compressive state).

This process of determining the presence or absence of load is conducted by checking the sign of the strain speed about the elements of the snow material model 6. The strain speed is obtained by dividing the strain by the time which has been required for the deformation. The size of the strain speed indicates the rate of deformation of the elements, and the sign indicates a tensile strain when it is positive and a compression strain when it is negative. In the determination according to the present example, when the strain speed is negative, it is determined that the deformation is under the load conditions with a relative compressive strain. In this manner, whether the elements of the current snow material model 6 are under the load conditions or no-load conditions can be determined by calculating the strain speed from the deformation condition of the elements obtained in the preceding calculation step and the deformation condition of the elements in the current calculation step and checking its sign.

When it has been determined that the deformation is under the load conditions in Step S520, whether the current deformation conditions of the elements are under the elastic deformation region A or the plastic deformation region B is determined in Step S530. For example, as shown in FIG. 23, the calculated deformation conditions of the elements (stress and volumetric strain) are plotted. The distortion conditions are always on the straight line L1 or its extension line L1' because the bulk modulus is used. When a plot point is in the elastic deformation region A like the plot point "Ya", it is regarded as an elastic deformation. On the other hand, when a plot point is in the plastic deformation region B like the plot point Yb, it is regarded as a plastic deformation. Determination could be done by other various approaches.

When it has been determined that the deformation of the elements is a plastic deformation, a process is performed to modify the calculated stress of the elements of the snow material model to the stress which is based on the characteristic curve L (Step S540). In Step S510, the stress is calculated by assuming the deformation of the elements as an elastic deformation. Therefore, when the actual deformation of the elements is a plastic deformation, it is considered that the elements have been deformed by a smaller stress. In short, the stress must be mitigated. Therefore, in this example, when Steps S520 and S530 are satisfied, a process is performed to change the stress into the stress corresponding to the volumetric strain with the use of the characteristic curve L. To be more specific, when the deformation conditions obtained by calculation are, for example, the point Yb shown in FIG. 23, it is modified to be the largest possible stress value Yb' on the characteristic curve that the volumetric strain εb can be. This deformation calculation of the snow material model is useful to obtain stable calculation results.

Figure 26A:
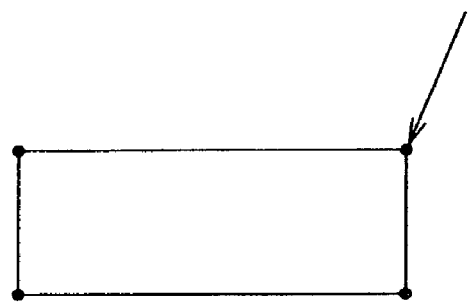
FIGS. 26A, 26B, 26C are diagrammatic view which explain a Lagrangian element.
Figure 26B:
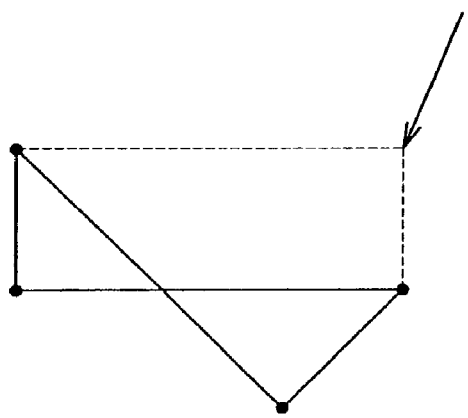
Figure 26C:
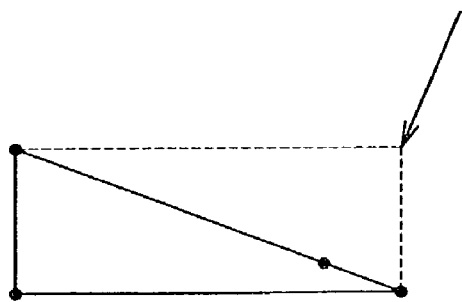

Besides the aforementioned examples, the present invention can be modified variously. For example, the snow material model 6 can be modeled with a Lagrangian element. A Lagrangian element breaks as shown in FIGS. 26A and 26B when largely deformed in the conventional case. However, as shown in FIG. 26C, even when it is largely deformed, the properties of snow can be reproduced by preventing the contact between the sides and nodal points of the elements or by deforming the elements like a film so as to propagate only a force to the adjacent elements.

The difference in the quality of snow can be expressed by controlling the bulk modulus, friction coefficient or other properties of the snow material model. As the road-surface matter, soil which is a compressive material could be also adopted. When soil is modeled, the bulk modulus of the elements is set according thereto; the other conditions are the same as in the case of snow.

What is claimed is:

1. A method for tire rolling simulation comprising the steps of:
    setting a tire model by modeling a tire with the use of elements capable of numerical analysis;
    setting a road surface model including a road-surface matter model formed by modeling road-surface matter forming a road surface with the use of elements that can be numerically analyzed and can cause a volume change due to compression which is substantially permanent;
    setting a requisite condition for performing a tire rolling simulation by making said tire model get in contact with said road-surface matter model;
    performing the tire rolling simulation based on the requisite condition, wherein
    the tire rolling simulation comprises the steps of:
        calculating deformation of the rolling tire model at minute time increment intervals;
        calculating deformation of the road-surface matter model at minute time increment intervals;
        exchanging at least one result of individual deformation calculations between the tire and the road-surface matter models to couple these models;
        setting a yield function by using a first invariant and a second invariant of the stress tensor each acting on at least one element in the road-surface matter model;
        determining whether deformation of the at least one element in the road surface matter model is in a plastic region or elastic region based on the yield function; and
        reducing the stress of the at least one element in the road-surface matter model based on the yield function when the deformation of the at least one element has been determined as in the plastic region, wherein
    each said calculating step comprises the steps of:
        calculating a stress wave propagation time of each deformed element; and
        changing the time increment for next calculation based on the minimum value of the stress wave propagation time.

2. The method for tire rolling simulation of claim 1, wherein said road-surface matter model is a snow material model formed by modeling snow.

3. The method for tire rolling simulation of claim 2, wherein the step of exchanging comprises
    a process of giving at least one of the shape and speed of said tire model to the snow material model as a boundary condition thereof, and
    a process of giving at least one of the shape, speed, and reaction force of said snow material model to the tire model as a boundary condition thereof.

4. The method for tire rolling simulation of claim 2, wherein the time increment for next calculation is calculated based on at least one value of the size, density, and hardness of each of the elements of a deformed snow material model in the step of calculating deformation of said snow material model.

5. The method for tire rolling simulation of claim 4, wherein said time increment is 0.5 to 5 μsec.

6. The method for tire rolling simulation of claim 1, wherein the time increment for next calculation is calculated based on at least one value of the size, density, and hardness of each of the elements of a deformed tire model in the step of calculating deformation of said tire model.

7. The method for tire rolling simulation of claim 6, wherein said time increment is 0.5 to 5 μsec.

8. A method for tire rolling simulation comprising the steps of:
    setting a tire model by modeling a tire with the use of elements capable of numerical analysis;
    setting a road surface model including a road-surface matter model formed by modeling road-surface matter forming a road surface with the use of elements that can be numerically analyzed and can cause a volume change due to compression which is substantially permanent;
    setting a requisite condition for performing a tire rolling simulation by making said tire model get in contact with said road-surface matter model; and
    performing the tire rolling simulation based on the requisite condition, wherein
    the tire rolling simulation comprises the steps of:
        calculating deformation of the rolling tire model at minute time increment intervals; and
        calculating deformation of the road-surface matter model at minute time increment intervals, wherein
    each said calculating comprises the steps of:
        calculating a stress wave propagation time of each deformed element; and
        changing the time increment for next calculation based on the minimum value of the stress wave propagation time.

9. A method for tire rolling simulation comprising the steps of:
   setting a tire model by modeling a tire with the use of elements capable of numerical analysis;
   setting a road surface model including a road-surface matter model formed by modeling road-surface matter forming a road surface with the use of elements that can be numerically analyzed and can cause a volume change due to compression which is substantially permanent;
   setting a requisite condition for performing a tire rolling simulation by making said tire model get in contact with said road-surface matter model; and
   performing the tire rolling simulation based on the requisite condition, wherein
   the tire rolling simulation comprises the steps of:
      calculating deformation of the rolling tire model at minute time increment intervals;
      calculating deformation of the road-surface matter model at minute time increment intervals; and
      exchanging at least one result of individual deformation calculations between the tire and the road-surface matter models to couple these models, wherein
   each said calculating comprises the steps of:
      calculating a stress wave propagation time of each deformed element; and
      changing the time increment for next calculation based on the minimum value of the stress wave propagation time.

* * * * *